United States Patent [19]
Price

[11] Patent Number: 5,432,327
[45] Date of Patent: Jul. 11, 1995

[54] EMBOSSED CARD READER WITH FLOATING READ HEAD

[75] Inventor: James F. Price, Alpharetta, Ga.

[73] Assignee: Microbilt Corporation, Atlanta, Ga.

[21] Appl. No.: 92,334

[22] Filed: Jul. 15, 1993

Related U.S. Application Data

[63] Continuation-in-part of Ser. No. 970,410, Oct. 30, 1992, Pat. No. 5,369,263.

[51] Int. Cl.⁶ .............................................. G06K 7/04
[52] U.S. Cl. ................................... 235/448; 235/475
[58] Field of Search ................................ 235/448, 475

[56] References Cited

U.S. PATENT DOCUMENTS

| | | |
|---|---|---|
| 3,174,398 | 1/1973 | Brock . |
| 3,470,358 | 9/1969 | Sallach . |
| 3,612,832 | 10/1971 | Goldstein et al. . |
| 3,629,834 | 12/1971 | Randall et al. . |
| 3,656,172 | 4/1972 | Wiltz et al. . |
| 3,671,720 | 6/1972 | White et al. . |
| 3,704,360 | 11/1972 | McFadden . |
| 3,752,074 | 8/1973 | White et al. . |
| 3,760,162 | 9/1973 | Holter . |
| 3,774,015 | 11/1973 | Lockard . |
| 3,806,707 | 4/1974 | White et al. . |
| 3,814,905 | 6/1974 | Lawrence et al. . |
| 3,816,707 | 6/1974 | Kleinmeyer et al. . |
| 3,825,727 | 7/1974 | Sarcia . |
| 3,854,661 | 12/1974 | Weber et al. . |
| 3,859,509 | 1/1975 | Dillingham et al. . |
| 3,900,717 | 8/1975 | Wu . |
| 3,917,925 | 11/1975 | del Rio . |
| 3,939,327 | 2/1976 | Humphrey . |
| 3,970,826 | 7/1976 | Kleimeyer et al. . |
| 4,035,614 | 7/1977 | Frattarola et al. . |
| 4,119,270 | 10/1978 | Hill et al. . |
| 4,215,813 | 8/1980 | Hill et al. . |
| 4,476,507 | 10/1984 | Koike et al. . |
| 4,616,128 | 10/1986 | Case . |
| 4,628,195 | 12/1986 | Baus . |
| 4,684,794 | 8/1987 | Holland-Letz . |
| 4,839,508 | 6/1989 | Frolov . |
| 4,845,770 | 7/1989 | Koshida . |
| 4,879,607 | 11/1989 | Redemacher . |
| 4,950,875 | 8/1990 | Koshida et al. . |
| 4,952,786 | 8/1990 | Inoue . |
| 5,089,694 | 2/1992 | Zerfahs et al. . |
| 5,175,423 | 12/1992 | Kayan . |
| 5,264,688 | 11/1993 | Matsuno et al. . |

FOREIGN PATENT DOCUMENTS 1396150 6/1975 United Kingdom .

Primary Examiner—Harold Pitts
Attorney, Agent, or Firm—Jones & Askew

[57] ABSTRACT

A low cost, compact embossed card reader for reading embossed characters on credit or debit cards and for integration into a combined magnetic character/magnetic stripe terminal. A low-profile housing defines a card path and provides a surface for mounting a removable read head. The housing includes an integrated card guide for guiding the embossed characters along a linear path adjacent the read head. The read head includes a plurality of pins mounted orthogonally to the card, and aligned so as to scan each of the embossed characters in parallel paths as the card moves relative to the read head. The pins move upwardly as they encounter an embossed character and open a normally-closed switch formed by a printed circuit board and a plurality of leaf spring fingers. The read head is operative to float relative to the surface of the card and relative to the embossing on the card.

22 Claims, 24 Drawing Sheets

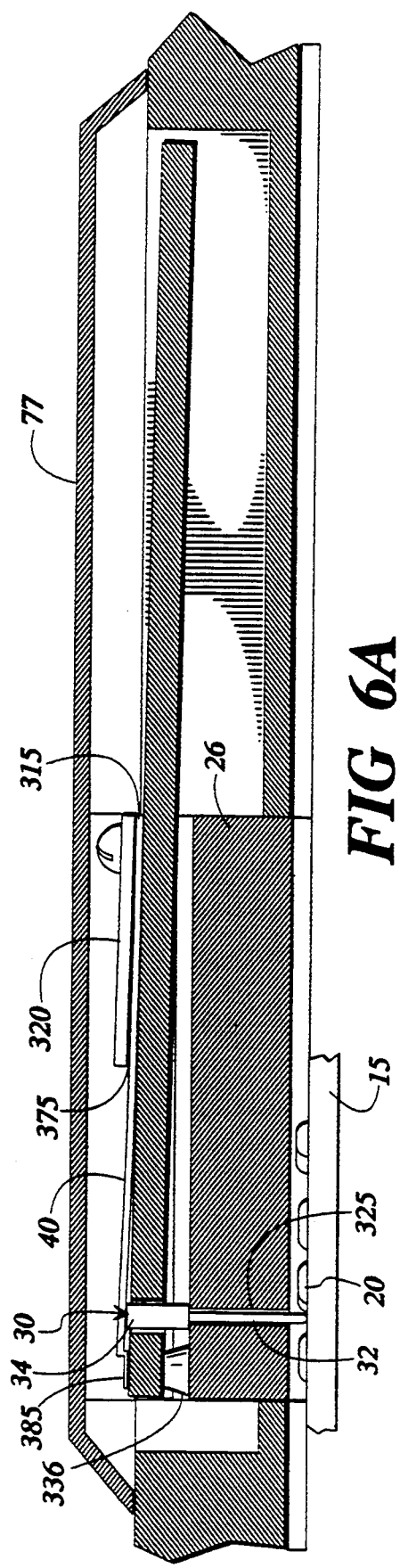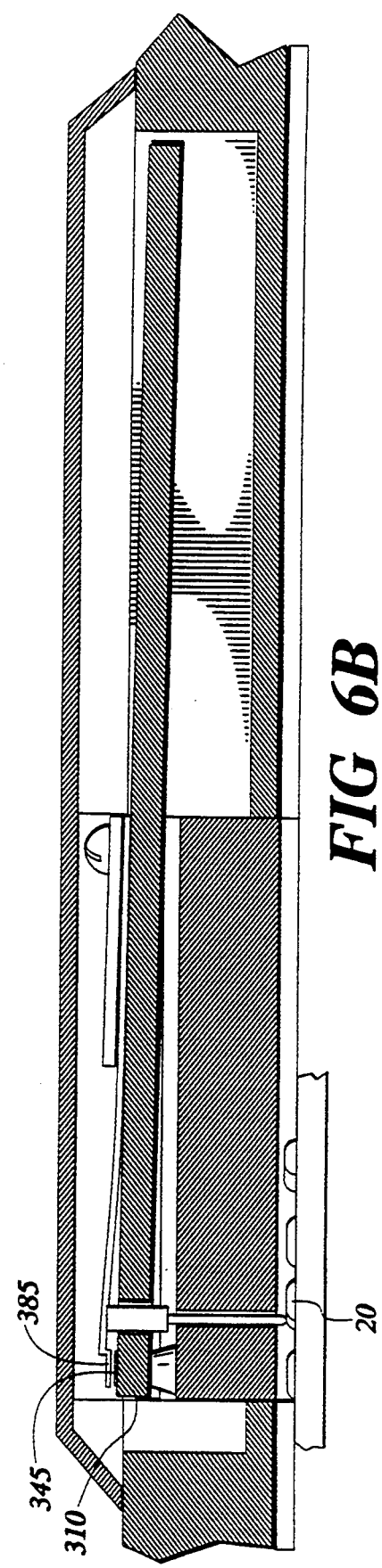
FIG 6A
FIG 6B

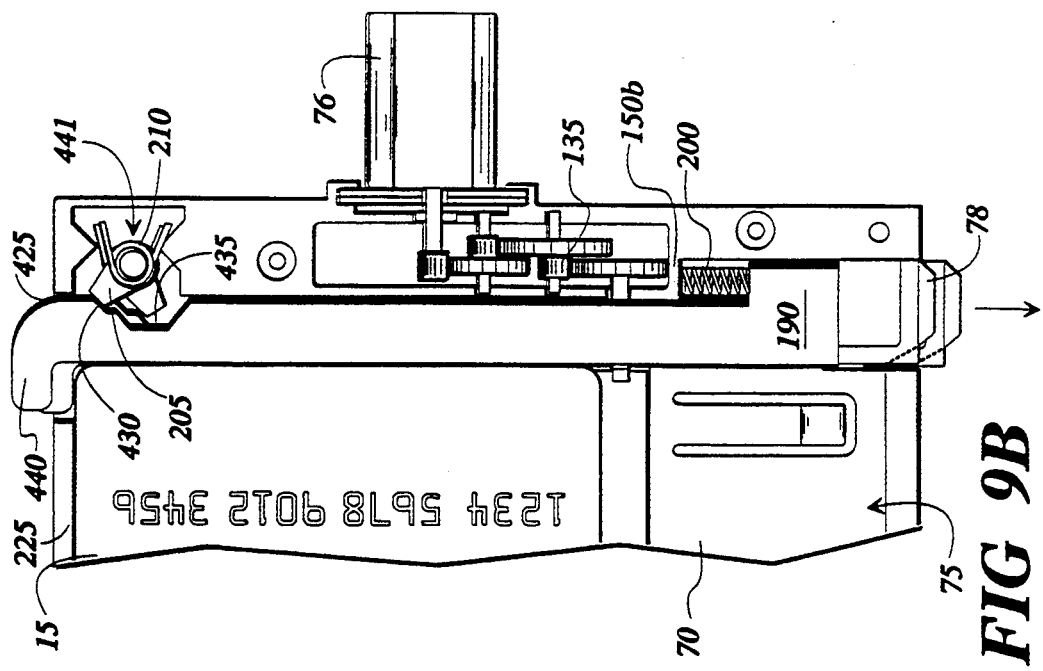
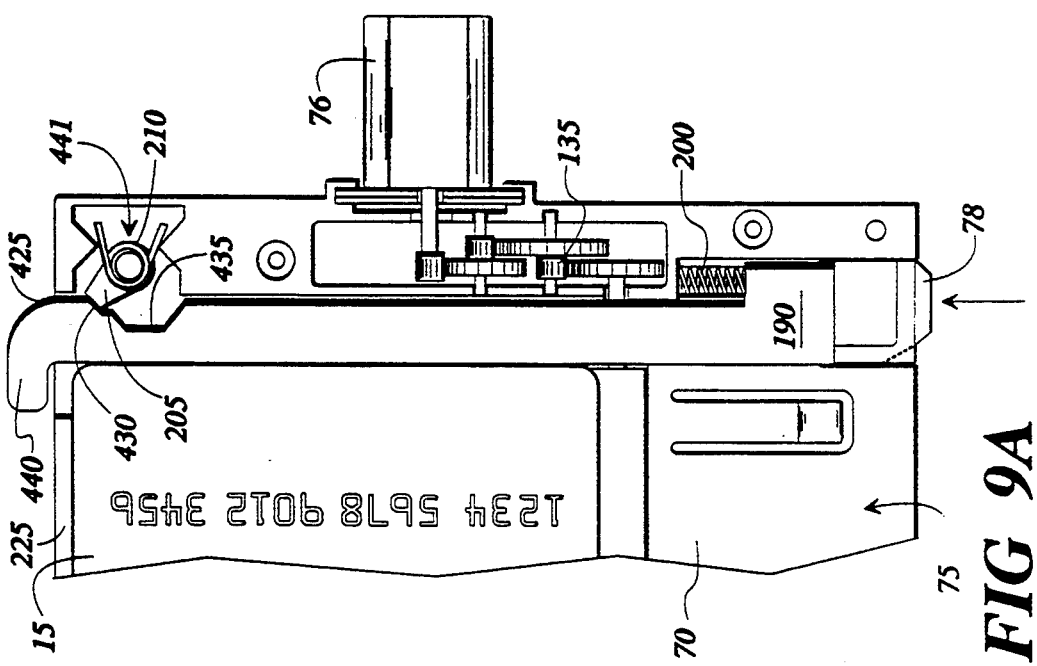

FIVE PIN METHOD

| P5 P1 (525, 527) | COUNT | DECIMAL COUNT (530) | ENCODER (532) | DECIMAL ENCODER (535) | DATA WINDOW (542) | DECODED VALUE (543) |
|---|---|---|---|---|---|---|
| 00000 | 8B | 139 | 31 | 49 | | |
| 10000 | CE | 206 | 3E | 62 | W1 | |
| 10001 | 17 | 23 | 3F | 63 | | |
| 11001 | 09 | 9 | 40 | 64 | | |
| 11101 | 0E | 14 | 40 | 64 | | |
| 11111 | C5 | 197 | 56 | 86 | W2 | 1 |
| 11110 | 0C | 12 | 58 | 88 | | |
| 11100 | 0A | 10 | 58 | 88 | | |
| 10100 | 01 | 1 | 58 | 88 | | |
| 10000 | EA | 234 | 6F | 111 | W3 | |
| 00000 | C5 | 197 | 7B | 123 | | |
| 01000 | 0F | 15 | 7C | 124 | | |
| 11000 | 1F | 31 | 7E | 126 | | |
| 11001 | 0A | 10 | 7E | 126 | | |
| 11101 | AB | 171 | 8E | 142 | W1 | |
| 10101 | 8D | 141 | A0 | 160 | W2 | 2 |
| 10111 | 88 | 136 | B2 | 178 | W3 | |
| 10011 | 12 | 18 | B3 | 179 | | |
| 10010 | 30 | 48 | B6 | 182 | | |
| 00010 | 04 | 4 | B7 | 183 | | |
| 00000 | B3 | 179 | CB | 203 | | |
| 10000 | 02 | 2 | CB | 203 | | |
| 10001 | A3 | 163 | D4 | 212 | W1 | |
| 10101 | B4 | 180 | EA | 234 | W2 | |
| 11101 | 0C | 12 | EC | 236 | | |
| 11111 | F0 | 240 | F5 | 245 | W3 | 3 |
| 01111 | 11 | 17 | F6 | 246 | | |
| 01110 | 1A | 26 | F8 | 248 | | |
| 01010 | 26 | 38 | FA | 250 | | |
| 01000 | 01 | 1 | FA | 250 | | |
| 01010 | 01 | 1 | FA | 250 | | |
| 01000 | 03 | 3 | FB | 251 | | |
| 00000 | E3 | 227 | 09 | 9 | | |

*FIG. 18*

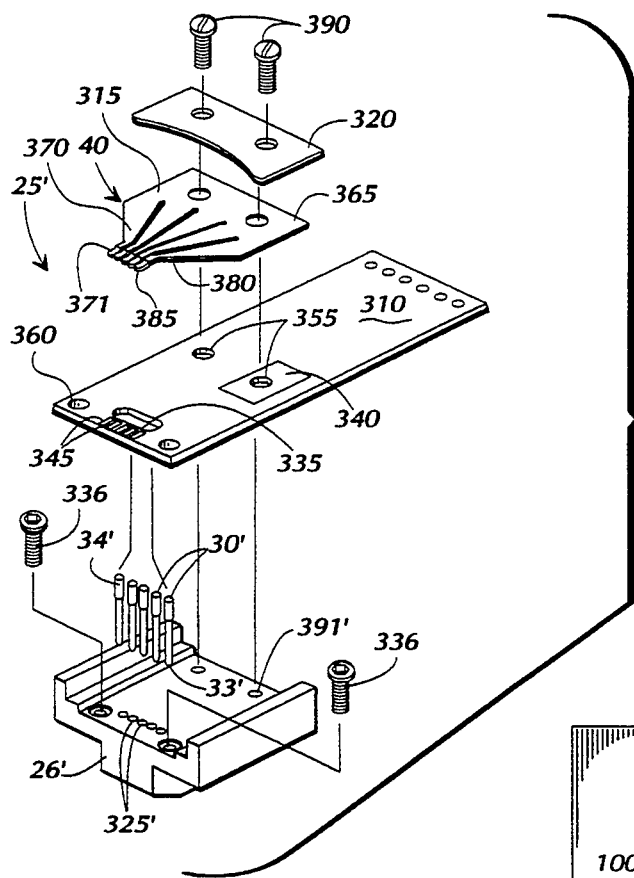
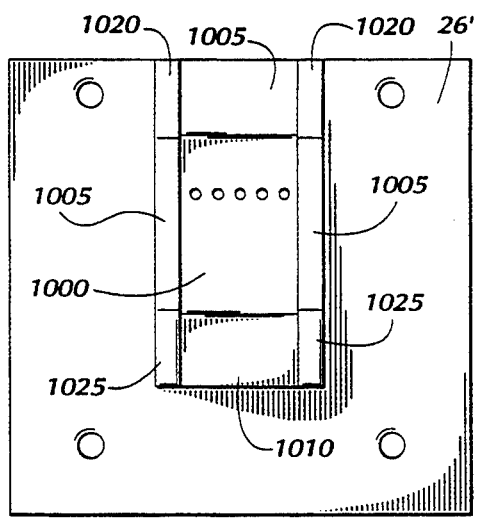
FIG. 21
FIG. 24
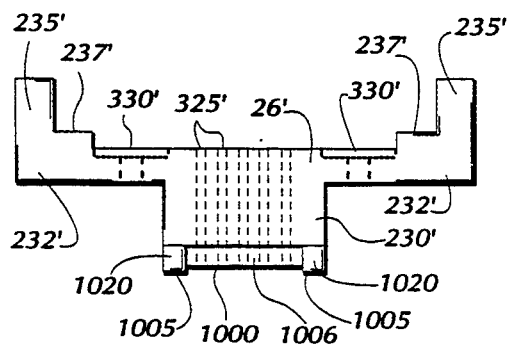
FIG. 22
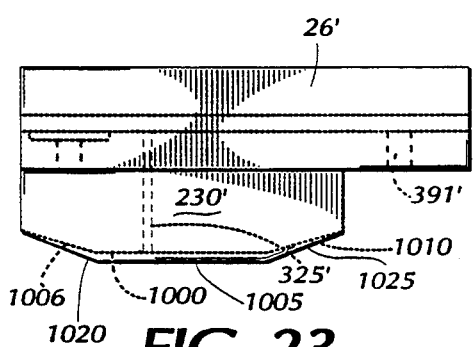
FIG. 23

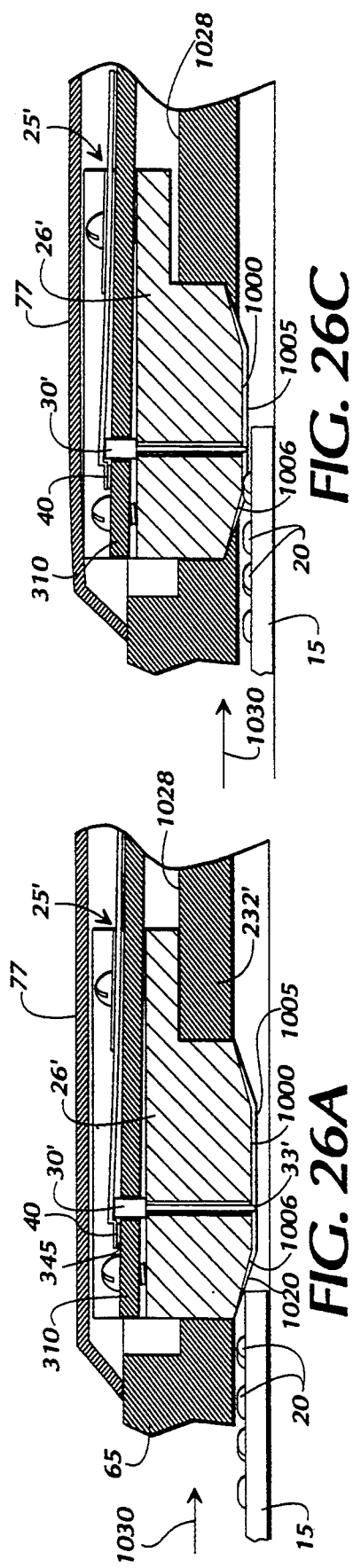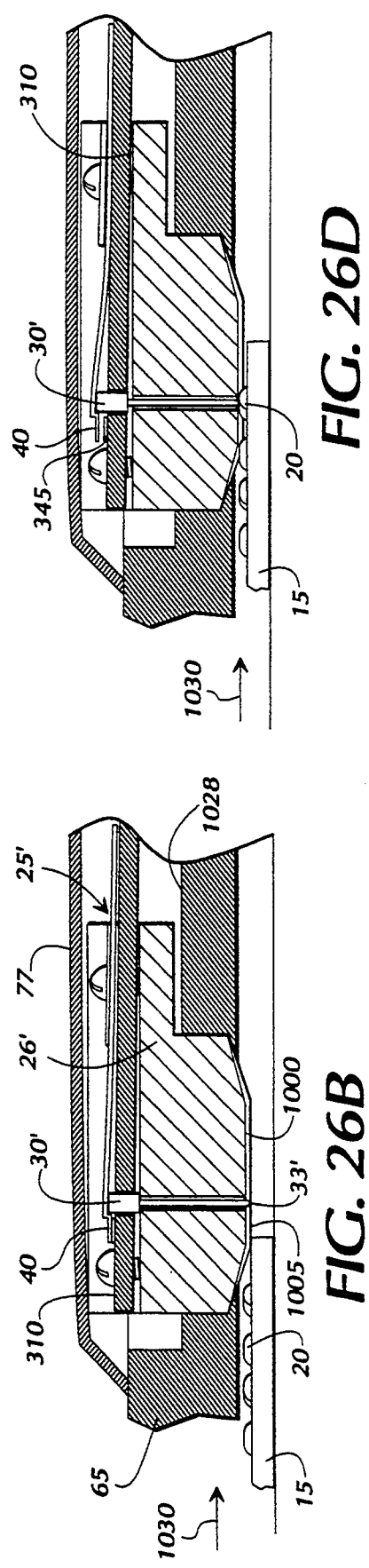

EMBOSSED CARD READER WITH FLOATING READ HEAD

CROSS REFERENCE TO RELATED APPLICATION

This application is a continuation-in-part of U.S. patent application Ser. No. 07/970,410, filed Oct. 30, 1992, entitled "Embossed Card Reader" now U.S. Pat. No. 5,369,263.

TECHNICAL FIELD

The present invention relates generally to apparatus for reading data from a data card, and more particularly relates to a device for reading characters embossed on a credit card or debit card.

BACKGROUND OF THE INVENTION

Over the last 20 years, credit cards have gained widespread acceptance as a means of paying for goods and services. In 1991, American consumers used credit cards to spend in excess of $250 billion. Worldwide, the value of credit card transactions exceeded $600 billion. As used herein, the term "credit card" is intended to include credit cards, charge cards, debit cards, and other financial account cards. Credit cards in use today typically include embossed characters that indicate the name of the cardholder, the account number, and an expiration date. Virtually all current credit cards also have a magnetic stripe containing the account number, expiration date and other information.

Before most retail transactions involving credit cards are completed, merchants seek authorization from a credit card issuer in order to verify the validity of the credit card and minimize the risk of fraudulent or unauthorized use. Over the years, merchants have relied on a variety of methods to obtain authorization. Initially, card issuers provided printed "warning bulletins" that listed the account numbers of credit cards that merchants should not accept. Subsequently, merchants were able to receive "on-line" authorizations by providing the account number, expiration date and purchase amount to the issuer via telephone. Initially, this was accomplished speaking to an operator. The operator entered the data into a computer terminal and provided an authorization code verbally to the merchant. Later, merchants were enabled to enter the data via a telephone keypad and receive an audible authorization code from an audio response unit. Further advances have allowed the merchant to enter the data by means of a keypad on a dedicated data card transaction terminal. Many of these terminals automatically dial a card issuer's telephone number, transmit the proposed transaction data (including account number) via modem, and display an authorization code received from the card issuer.

It became apparent a number of years ago that both fraud and errors could be minimized if there were some means for automatically reading the account data from the credit card, rather than requiring manual data entry. In addition, the amount of time required to process each transaction could be drastically reduced. As mentioned above, virtually all credit cards now include a magnetic stripe containing the cardholder's account number, expiration date and other information. A magnetic stripe or "card swipe" reader is often employed in a data card terminal for automatically reading the information from the magnetic stripe. With these terminals, a merchant swipes the credit card through a slot and the terminal automatically reads and decodes the account number and expiration date from the card's magnetic stripe. The terminal then prompts the merchant to enter the purchase amount. Once the data is acquired, the terminal automatically places a call to a host computer, transmits the transaction data to the host computer via modem, and displays the authorization code received from the host computer. Examples of such terminals are found in pending U.S. application Ser. Nos. 07/790,658, filed Nov. 8, 1991, entitled "Card Transaction Terminal", and 07/820,401, filed Jan. 10, 1992, entitled "Data Card Terminal with Embossed Character Reader and Signature Capture", both assigned to the assignee of the present application, and in Chang et al. U.S. Pat. No. 4,788,420.

Industry data indicates that a credit card's magnetic stripe is unreadable in approximately 8-12% of credit card transactions. This situation occurs when the magnetic stripe has been damaged or intentionally destroyed. In cases where the magnetic stripe is unreadable, the merchant must read the account number and expiration date from the embossing on the card and provide the transaction data to the card issuer using one of the less automated methods described above. As a result, the advantages of automated data entry are lost (e.g., the risk of error is increased).

In cases where the magnetic stripe is damaged, it would be desirable to automatically read and decode the account number from the credit card's embossed characters. If the embossed account number can be read automatically, the chances of error are reduced.

Devices for automatically reading embossed characters on a credit card are known in the art. Examples of such devices are described in U.S. Pat. Nos. 4,119,270, 3,825,727, 3,814,905, and 3,806,707. These prior art embossed card readers are used in a variety of applications, including equipment used by card issuers to verify that the magnetic stripe data corresponds to that embossed on the card, equipment used to match embossed cards with pre-printed mailers, and large point-of-sale terminals.

White et al. U.S. Pat. No. 3,806,707 describes a point of sale credit card terminal which employs a "bed of nails" matrix approach to reading the embossing. Reading is achieved through an arrangement of sensing pins that are independently mounted in close groupings in a block and biased by individual vanes of a common leaf spring. Pin condition is sensed either through means of electrical contacts activated by the pins or electromagnetic sensors which change in condition responsive to the movement of the pins. In the embodiment therein described, the pins are grouped in groups of five on generally rectangular coordinates so as to achieve a discrete pin condition for each of the numbers zero to nine, inclusive.

The terminal described in the White et al. patent appears to require provision of a separate matrix of pins and springs for each character or numeral to be read, thereby necessitating multiple circuits, springs, pins, etc. and increasing cost, size, and complexity. Since the card is read while statically held, the pins and support block would not be suitable for reading embossings on a moving card.

Merchants desire to minimize both the costs associated with credit card transaction processing and the space occupied by the card transaction equipment, especially equipment used at point of sale. Consequently, modem card swipe terminals have become more widely used as they have become less expensive to acquire and use and more compact. Embossed card readers such as those described in the above patents are not in widespread use, perhaps because the known approaches for reading the embossings are large, bulky, complex, and expensive. As a result of the size of the "bed of nails" approach, it is not suitable for integration into a modern, compact point-of-sale credit card terminal. The complexity of these prior art embossed card readers also results in their cost exceeding the price most merchants would be willing to pay for the ability to automatically read the embossed characters on a credit card.

Lockard U.S. Pat. No. 3,774,015 describes an optical reader for an embossed card wherein a single fixed read head is utilized. Driving wheels engage the embossed card and transport the embossments thereof serially past the read head. The read head includes a plurality of optical transmission lines, which are purposely selectively shuttered by the raised embossments. A light signal transmitted through the optical transmission lines is selectively shuttered to provide an intermittent optical code identifying each individual raised embossment of the serially arranged array. While this approach provides the advantage of a single read head and includes a structure which positively biases the read head into positive engagement on the inclined surfaces of individual embossments, a worn card with flattened embossings may not be high enough to shutter reliably. Optical read heads also may be affected by changes in the background color or reflectivity of the credit card surface. Such changes may affect the amount of light received by the optical read head and may affect the accuracy of the read cycle. Moreover, the optical shutter is susceptible to build-up of dirt and must be cleaned often.

Hill et al. U.S. Pat. No. 4,215,813 describes an embossed card reader comprising a head having a plurality of moveable fingers disposed to sense the holes or embossing when a card is moved relative to the head. The fingers carry light guides thereon which are spaced from and disposed to transmit light from a fixed source. A light cut-off shield is disposed between the source of the light and the light guides to intercept and prevent or permit transmission of the light when the fingers pass over the embossed indicia or holes. A principal disadvantage of this approach to embossed reading is that a number of small complex parts (e.g., lamp, light pipes, mask or shield, height adjustable arms, spring wire fingers, light sensors, electronics for light sensors, etc.) are required to provide the mechanism for biasing the fingers into contact with the embossing and maintain proper alignment. While the reader has been employed with success in card verifier inserter systems, it has proved difficult to down-size and manufacture cheaply and reliably for mass production type credit card terminals. Since this approach is designed to read the back of a credit card, it is not suitable for cards encountered by merchants. It is not uncommon for cardholder's to place stickers on the back of the card. Such stickers would likely cover at least a portion of the embossed characters and would prevent the reader from properly detecting the embossed characters.

By reading embossed characters from the front or top surface of the card, the difficulties created by stickers and other obstructions are avoided. However, the condition and elevation of embossed characters relative to the surface of the card may vary from one card to another, and may make it difficult to accurately read the characters on different cards. The variations in the elevation of the embossed characters typically relate to the age of the card and to the amount of wear and tear it has experienced. New cards may have relatively elevated characters with sharp, well defined vertical sides. Older, worn cards may have shorter, rounder characters. Consequently, an embossed card reader capable of reading the variety of cards typically encountered by merchants must be able to read the short rounded characters found on older, worn cards, and the sharper, more elevated characters found on new cards.

Therefore, there is a need for an embossed card reader that is small enough to be integrated into a compact point-of-sale terminal that includes both a magnetic stripe reader and an embossed card reader. Such an embossed card reader must have a cost that is not prohibitive to merchants. In addition, such an embossed card reader must be robust and capable of reading credit cards that are worn and/or warped.

SUMMARY OF THE INVENTION

The present invention satisfies the above described needs by providing improved apparatus and methods for decoding data embossed on a card. The present invention provides a low cost, compact embossed card reader that is capable of being integrated into a combined magnetic stripe/embossed card reader terminal. The apparatus provides a plurality of sensing elements that are capable of accurately detecting embossed characters on worn or damaged credit cards. In addition, the methods of the present invention control the reading of data from the card and the decoding of that data. The preferred decoding method is robust and is able to accurately decode embossed character data in spite of erroneous or invalid data resulting from damage to the card or electrical noise in the card reading apparatus.

Briefly described, an embossed card reader constructed according to the present invention includes means for providing relative movement between a card having embossed characters and a plurality of pins positioned to contact the characters. The pins include an elongated contact portion for contacting the characters and a support portion having a diameter larger than the contact portion. The pins are supported generally orthogonally to the surface of the card by a support block that includes a plurality of support passageways having a diameter for slidably receiving the contact portion of the pins. The reader also includes a leaf spring including a leaf spring body and a plurality of leaf spring fingers. Each of the fingers defines a generally triangular shape and has a base portion that is operatively connected to the leaf spring body. The leaf spring fingers also include an apex positioned opposite the base. The fingers contact the support portion of the pins supported in the support block. The leaf spring forms an electrical contact switch that provides signals responsive to the movement of the pins in contact with characters on a card.

More particularly described, the leaf spring fingers are mounted over the support portion of the pins in a cantilever arrangement. In this manner, the fingers are deformed in response to the upward movement of the pin when it is in contact with the characters. The fingers are supported by a support surface such that the leaf spring is in operative connection with the pins. The support surface includes an opening for receiving and allowing passage therethrough of the pins, a ground pad positioned on the support surface on one side of the opening, and a plurality of electrical contact pads positioned on a side of the opening opposite the ground pad. Each of the fingers includes a central region disposed over the opening and a distal portion positioned operatively adjacent the ground pad such that the movement of a pin through the opening causes the making and breaking of an electrical switch defined between a contact pad on the surface and the leaf spring finger. In order to allow for compensation for variations in pin lengths and component thicknesses, the present invention also provides means for selectively adjusting the height of the support surface relative to the support block.

In the preferred embossed card reader, the support surface is a printed circuit board that includes the electrical contact pads. The adjusting means includes a support block having at least one support shelf for supporting the printed circuit board and at least one threaded bore. The threaded bore receives a threaded bolt and the printed circuit board is adjusted upon the head of the threaded bolt.

In an alternative embodiment, the preferred embossed card reader includes a floating embossed card read head similar to the read head described above. However, the floating read head provides a floating read head support block including a character contact surface that is operative to engage with the card, ride atop the card, and remain in contact with the embossed characters as the card is moved past the pins in the read head. The support block also comprises inclined leading and trailing surfaces for gradually and gently engaging with the card.

To ensure contact with the embossed characters, the floating read head is biased downward against the card. In order to allow the support block to ride up on a card and its embossed characters, a character contact surface including a flat central portion and angled leading and trailing portions for engaging and disengaging the embossing smoothly. In addition, the support block includes two parallel card engaging guide rails that include central portions and angled leading and trailing portions.

As in other embodiments, the floating read head includes a plurality of pins that extend through passageways defined in the support block and are positioned to contact the embossed characters as the card moves in relation to the read head. The pins extend into a region defined at one end by the character contact surface and at the opposite end by the card engaging guide rails.

According to another aspect of the invention, there is provided a method for reading embossed characters on a card. The method includes the steps of providing a floating read head that is operative to move vertically relative to the surface of an embossed card, with embossment reading pins that are operative to move vertically relative to the surface of embossing on the card; engaging the edge of an embossed card with card engaging guide rails provided on the floating read head; responsive to the engagement of the card engaging guide rails with the card edge, lifting the floating read head relative to the surface of the card; engaging embossing on the card with embossment reading pins disposed in the floating read head to read the embossing; reading signals generated in response to movement of embossment reading pins; and, responsive to the signals, decoding characters represented by the embossing.

According to another aspect of the present invention, the embossed card reader includes means for detecting the insertion of the card at an insertion point and means for activating a drive roller that engages the card once the presence of the card is detected. As the card is driven by the drive roller, the apparatus provides means for measuring the distance the card has travelled. In the event the motor fails or the card becomes jammed, the apparatus provides a manual ejector that may be used to dislodge the card.

More particularly described, the preferred embossed card reader includes a housing that forms a channel or path in which the card travels. The preferred housing also includes an embossed character guide by which the characters on the card are guided along a linear path adjacent the read head. The pins for reading the embossings form a part of a removable read head assembly mounted in the housing top portion adjacent the card path. The read head assembly includes a pin support block, passageways supporting the pins, a printed circuit board including the electrical contact pads, and a cover affixed to the housing that holds the read head in position in the housing.

According to another aspect of the present invention, a method for reading embossings on a card is provided. The method of the present invention includes providing a card slot, detecting the insertion of the card into the card slot and activating a drive roller to engage the card and move the card along the path. As the card moves along the path, the method measures the distance the card travels and reversing the direction of travel of the card in response to the card having travelled a predetermined distance along the path. As the card travels in the path, a sensor engages the embossings. After the sensor reads the embossings, the card is ejected from the path and the embossings are decoded.

More particularly described, the preferred terminal measures the distance of travel of the card by providing pulses corresponding to a predetermined distance of travel of the card; and sensing the pulses.

The decoding algorithm of the present invention includes the steps of providing a plurality of sensors disposed in a plurality of paths adjacent the characters. The paths include a first path corresponding to a top portion of the characters, a second path corresponding to an upper center portion of the characters, a third path corresponding to a center portion of the characters, a fourth path corresponding to a lower center portion of the characters, and fifth path corresponding to a bottom portion of the characters. As the characters travel adjacent the paths, the characters are scanned. As the characters are scanned, the method defines a common state in which none of the sensors are in contact with the embossed characters, detects a first transition from the common state in any of the sensors, and reads each of the plurality of sensors to form a first sensor state. After the first sensor state is formed, the method detects a subsequent transition on any of the sensors. If the transition is to any state other than the common state, the method reads each of the plurality of sensors to form a subsequent sensor state. The steps of detecting a transition and forming a subsequent sensor state are repeated until the sensors return to a common state. In response to the sensors returning to the common state, the read cycle is terminated and the sensor states are decoded to provide a data signal corresponding to the embossed character.

More particularly, the method may be carried out by moving the card relative to the sensors. Alternatively, the method may be carried out by holding the card stationary and moving the sensors relative to the card.

According to yet another aspect of the present invention, an improved method for decoding embossed characters is provided for use in an embossed card reader, including a plurality of data sensing elements for providing signals indicative of paths of travel of the sensing elements with respect to embossing on the data card. The method acquires data from the sensing elements at a predetermined sampling rate, the sampling rate being substantially greater than the expected rate of switch bounce for the sensing elements. Once the data is acquired, the data is filtered or debounced to remove states of the sensing elements having sampling occurrences less than a predetermined filter threshold value. Invalid data states are then deleted from the filtered data. The data that remains is utilized as data indicative of a data window representing one of a plurality of possible data windows corresponding to an embossed character. The valid data states are utilized by the method to determine whether subsequent data states form valid data state. In response to determination that the subsequent data state is a valid data state for the immediately preceding data state, the method utilizes the next determined data state for subsequent determinations as to the occurrence of valid data states. If the method determines that a predetermined proper succession of valid data states occurred, it provides an output indicative of decoding of the embossed character. If an invalid data state occurs subsequent to the occurrence of a valid data state, the method advances to the end of the valid data states indicative of the end of the embossed character to perform the steps of examining for valid data states in succession from the trailing edge of the character.

Accordingly, it is an object of the present invention to provide an embossed card reader for reading characters embossed on a card.

It is another object of the present invention to provide an embossed card reader that provides account data decoded from the embossed characters on a card to a terminal controller circuit.

It is another object of the present invention to provide a low cost, compact embossed card reader that may be integrated into a combined magnetic stripe/embossed character reader terminal.

It is another object of the present invention to provide a plurality of sensing elements capable of accurately detecting embossed characters on worn or damaged cards.

It is another object of the present invention to provide a method by which embossed characters from a card may be accurately decoded in spite of erroneous or invalid data resulting from damage to the card or electrical noise in the card reading apparatus.

It is another object of the present invention to provide an embossed card reader having means for providing relative movement between a card having embossed characters and a plurality of pins positioned to contact the embossed characters.

It is another object of the present invention to provide pins that have an elongated contact portion and a larger support portion and are supported orthogonal to said card by a support block.

It is another object of the present invention to provide a read head assembly including a leaf spring having a plurality of fingers.

It is another object of the present invention to provide a read head assembly utilizing normally closed electrical switches formed by a printed circuit board and leaf spring fingers mounted on the printed circuit board, where switches are opened as the fingers move upwardly in response to the pins engaging an embossed character.

It is another object of the present invention to provide means for adjusting the height of the printed circuit board to compensate for variations in component dimensions.

It is another object of the present invention to provide a floating read head assembly having a surface that guides itself along the top surface of the embossed characters on a card.

It is another object of the present invention to provide a sensor for detecting the insertion of the card within the card slot, and beginning a read cycle in response to the detection of the card.

It is another object of the present invention to provide a manual ejector removing cards from the card path.

It is another object of the present invention to form data windows formed upon the detection of transition in the data read from the card.

It is another object of the present invention to sample data from sensing elements at a predetermined sampling rate that is substantially higher than the expected rate of switch bounce.

It is another object of the present invention to filter the data read from the card to remove data values present for fewer than a predetermined number of samples.

It is another object of the present invention to decode a character based on the presence of a first valid state and a second expected value state.

It is another object of the present invention to remove invalid data elements from the data samples.

It is another object of the present invention to proceed to the trailing edge of a character and attempt to decode it backward in the event a first valid state and a second expected value state are not detected.

It is another object of the present invention to detect and decode characters that are not separated by a common state.

These and other objects, features, and advantages of the present invention may be more clearly understood and appreciated from a review of the following detailed description of the preferred embodiments and by reference to the appended drawings and claims.

BRIEF DESCRIPTION OF THE DRAWINGS

FIGS. 6A-6B are cross sectional views of the preferred read head subassembly taken along the line 6—6 of FIG. 5.

FIGS. 9A-9B are partial top plan views of a portion of the bottom portion of the housing showing the manual card ejector mechanism.

FIG. 18 is a chart illustrating an example of raw data read from the embossed characters on a card and the various post processing steps performed on the data.

FIG. 21 is an exploded perspective view of the preferred floating read head subassembly.

FIG. 22 is a front plan view of the floating read head support block used in the floating read head subassembly of FIG. 21.

FIG. 23 is a right plan view of the floating read head support block used in the floating read head subassembly of FIG. 21.

FIG. 24 is a bottom plan or "worm's eye" view of the floating read head support block used in the floating read head subassembly of FIG. 21.

FIGS. 26A-26D are partial cross-sectional views of the preferred embossed card reader of FIG. 2 taken along the line 12—12 of FIG. 2, showing the operation of the read head during a card read cycle, with the preferred floating read head subassembly of FIG. 21 substituted for the read head assembly of FIG. 4.

DETAILED DESCRIPTION OF THE PREFERRED EMBODIMENT

Figure 1:
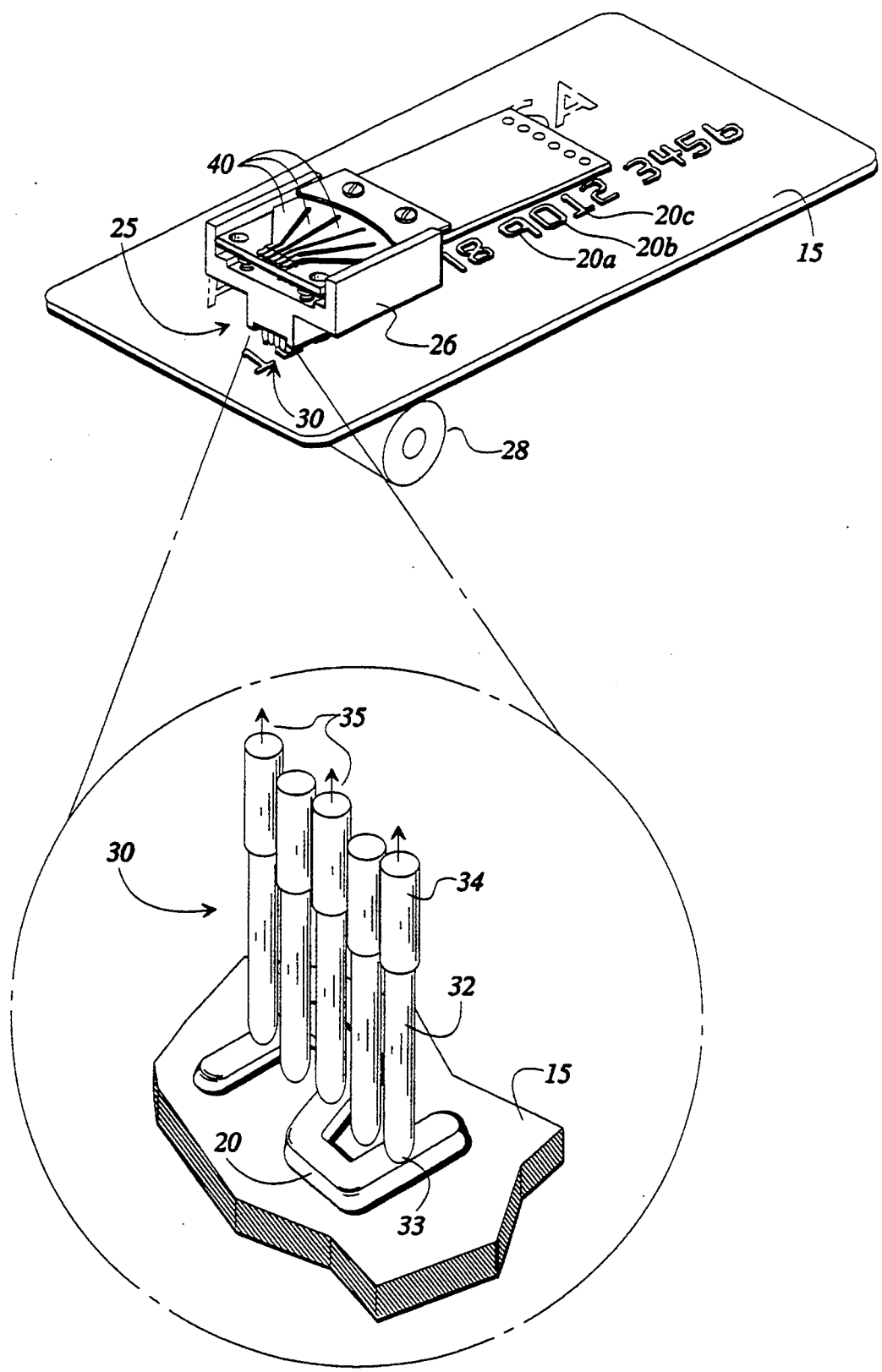
FIG. 1 is a partial perspective view of a read head subassembly constructed in accordance with the preferred embodiment of the present invention for reading characters embossed on a credit card.

Referring now to the drawings, in which like numerals refer to like elements throughout the several figures, a credit card 15 having a series of characters 20a, 20b, 20c . . . embossed thereon is read by a read head subassembly 25 that forms a part of the preferred embossed card reader 10 (not shown in FIG. 1 ). The form of the characters 20 in the embossed region of a credit card is governed by the Farrington 7B standard, such that each character is 0.1 by 0.17 inches, and has a distinctive shape (font). The Farrington font is described in ANSI Standard X4.13-1983, which is published by the American National Standards Institute, Inc., 1430 Broadway, New York, N.Y., and is incorporated herein by reference. Although the present invention is described in connection with reading and decoding the Farrington font, it should be understood that the methods and apparatus described herein are not limited to use with this embossing font, and that other fonts, character sets, alphabets, and numerals can also be decoded, provided that the teachings and methods described herein are followed.

The card 15 is moved relative to the read head subassembly 25 by a card transport including a drive roller 28 that biases the card against a plurality of pins 30, which are supported for axial movement in a support block 26. The interaction between the pins 30 and the embossed characters 20 are shown more clearly in the magnified view of FIG. 1. As the embossed characters 20 move along a path adjacent the read head subassembly 25, the pins 30 contact the embossed characters 20. Each pin 30 has an elongated contact portion 32 with a rounded endpoint 33 for contacting the embossed characters 20, and a support portion 34 having a diameter larger than the contact portion. The pins 30 are disposed orthogonally to the surface of the card 15, and are linearly arranged in a direction perpendicular to the direction of movement of the card 15, that is, the pins are arranged in a line to extend across the vertical dimension of a character or numeral.

Those skilled in the art will also appreciate that the read head subassembly 25 may be moved in relation to the card 15. This may be accomplished by installing the read head assembly 25 in a device similar to a manual credit card imprinter so that the card is held in place as the read head is moved along the embossed characters 20.

The pins 30 are biased by the vanes of a leaf spring 40 against the surface of the card. As a pin encounters the raised features of the embossed character 20, it is displaced in an upward axial direction as indicated by arrows 35. Those pins not contacting the embossed character remain biased in contact with the surface of card 15. When the pins 30 move upward, the top of the pin presses against a leaf spring finger 40 and causes an electrical contact to be broken. A plurality of electrical signals are provided in this manner, one for each pin that contacts an embossment, and allow the embossed characters 20 to be detected and decoded by the embossed card reader 10. The details of the read head subassembly 25 and its operation are discussed in greater detail below.

Figure 2:
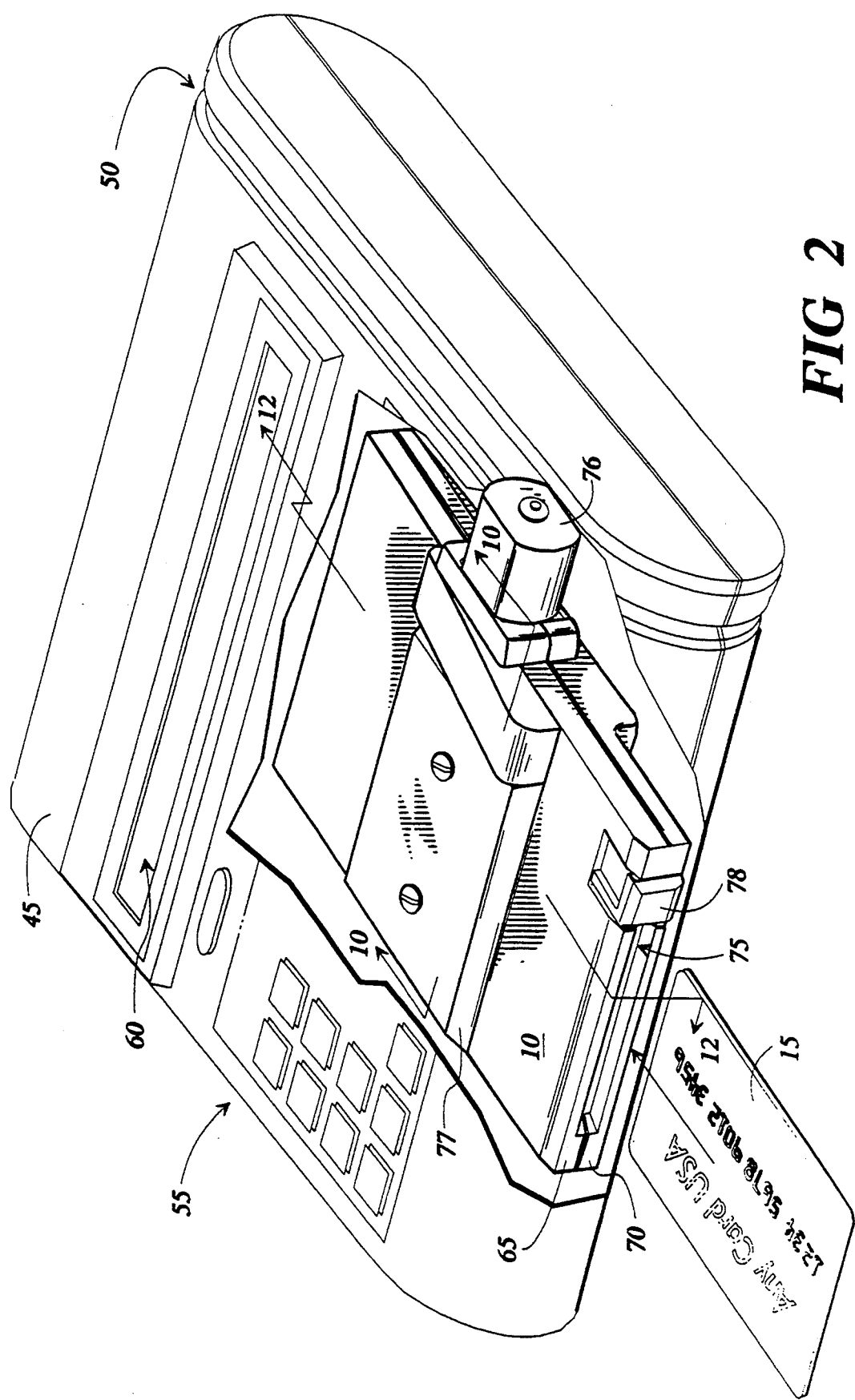
FIG. 2 is a partial perspective view of an embossed card reader constructed in accordance with the preferred embodiment of the present invention, as employed in a credit card transaction terminal.

FIG. 2 illustrates the preferred embossed card reader 10 installed in a credit card transaction terminal 45.

Such terminals often include a card swipe slot 50 for reading a card's magnetic stripe, a keypad 55, and an alphanumeric display 60. Those skilled in the art will understand that, with the exception of the embossed card reader 10, the terminal 45 operates in a manner similar to prior art credit card transaction terminals.

During a credit card transaction, a credit card is swiped through the swipe slot 50 so that the card's magnetic stripe (not shown) may be read by a magnetic read head (not shown) located in the swipe slot. After the merchant has entered the amount of the transaction via the keypad 55, the terminal transmits the transaction data to the credit card issuer or a third party transaction processor. After the terminal receives data from the issuer indicating whether the proposed transaction has been approved or declined, the terminal typically provides an appropriate message on the display 60.

While FIG. 2 shows a separate card swipe slot 50 for reading the magnetic stripe, it should be understood that the embossed card reader 10 constructed as described herein could be incorporated into a combination magnetic stripe and embossed card reader.

Unlike prior art terminals, the terminal 45 illustrated in FIG. 2 is also equipped with an embossed card reader 10 constructed in accordance with the preferred embodiment of the present invention. The preferred embossed card reader 10 includes a housing having a top portion 65 and a bottom portion 70. Together, the top and bottom portions 65, 70 define a card slot 75 into which the card 15 is inserted. An electric motor 76 is mounted to the reader to transport the card into and eject the card from the reader. A cover plate 77 covers the read head subassembly and engages with the subassembly to hold the subassembly securely in position. A manual ejector, of which the ejector bar cap 78 is accessible from the front of the reader, is provided to remove a card manually in the event of a jam or other malfunction.

As an example of usage of the present invention, if for some reason the terminal 45 is unable to read the data on the magnetic stripe as the card is swiped through the swipe slot 50, the card 15 may be inserted into the embossed card reader 10. The embossed card reader 10 is operative to automatically read and decode the embossed characters 20 and provide the account number to the terminal 45. The terminal then transmits the account number and other transaction data to the issuer or third party transaction processor for approval.

Figure 3:
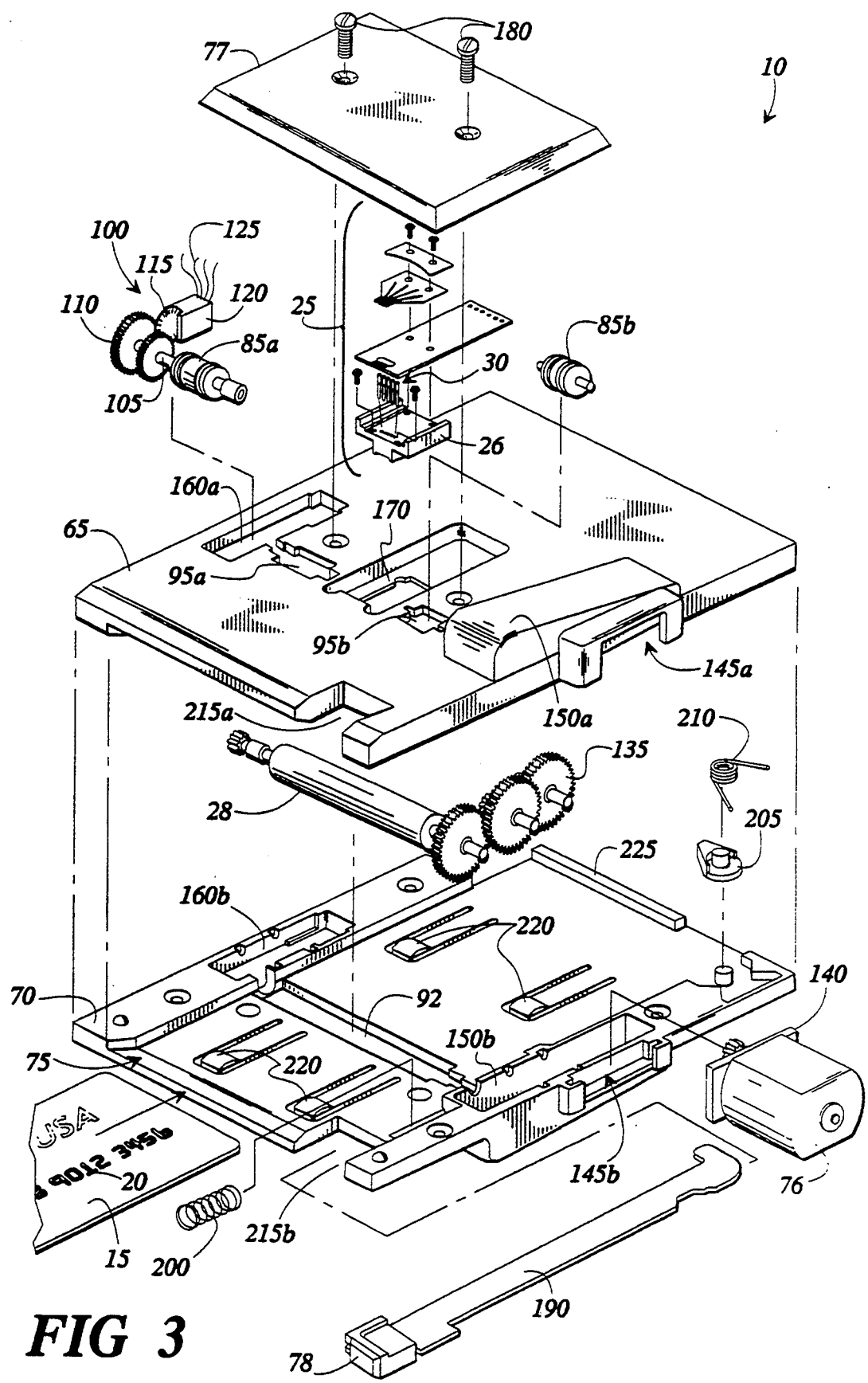
FIG. 3 is an exploded perspective view of the preferred embossed card reader of FIG. 2.

FIG. 3 is an exploded view of the preferred embossed card reader 10. As discussed in conjunction with FIG. 2, the embossed card reader 10 comprises a housing having a top portion 65 and bottom portion 70 that when joined together define a card slot 75 for receiving a credit card 15. Once the card 15 is inserted into the card slot 75, the inserted or leading edge of the card 15 encounters a drive roller 28 and two pinch rollers 85a, 85b. The drive roller 28 is rotatably mounted in a cavity 92 formed in the housing bottom portion 70, and has a compressible or pliable outer coating in order to provide friction between the card and the drive roller. The pinch rollers 85a, 85b are rotatably mounted in cavities 95a, 95b, respectively, formed in the housing top portion 65 and are positioned directly above the drive roller 28. The drive roller 28 and pinch rollers 85 are partially disposed to extend within the card slot 75 so that pinch rollers 85 force the card against the drive roller 28, thus minimizing the likelihood of slippage between the drive roller and the card.

Pinch roller 85a is connected to an optical encoder 100 by shaft 105 and gears 110. The optical encoder 100 comprises a slotted disk 115 and an optical interrupter 120. When a card 15 is inserted into card slot 75 and contacts the pinch roller 85, the card causes the rollers 85, shaft 105, and gears 110 turn. This, in turn, causes the slotted disk 115 to rotate. As the slotted disk 115 rotates, the transmission of light between the light emitting diode and phototransistor of the optical interrupter 120 is intermittently interrupted, and electrical signals or pulses are provided to a controller circuit, described below, via wires 125. The preferred optical encoder 100 and gears 110 are constructed so that the encoder provides resolution of approximately 0.002 inches. Thus, movement of the card 15 within card slot 75 may be accurately measured by counting pulses received from the encoder 100. By accurately measuring the movement of the card, the embossed character read cycle is made speed independent.

Prior to the insertion of a card into the card slot 75, the slotted disk 115 is stationary and the signals from the optical encoder 100 are static. When the card is inserted, the resulting rotation imparted to the slotted disk 115 causes a transition in the signals provided on wires 125. In response to the detection of these transitions in the signals from the optical encoder 100, the motor 76 is energized and the drive roller 28 is driven by a series of gears 135. Once the motor 76 is energized, the card 15 is pulled into the card slot 75. The path of the card will be described in more detail below.

The motor 76 is attached to a mounting plate 140, which itself is confined in motor mounting slots 145a, 145b defined in the top and bottom portion 65, 70 of the housing. A gear covering 150a deemed in the housing top portion 65 covers and protects the gears 135, which are rotatably supported in a gear well 150b defined in the housing bottom portion 70. The gears 110 and optical encoder 100 are located in gear support apertures 160a, 160b, defined in the top portion 65 and bottom portion 70, respectively.

The read head subassembly 25 is mounted in a cavity 170 defined in the housing top portion 65. The cavity 170 is positioned so that the pins 30 of the read head subassembly 25 are disposed between the pinch rollers 85, opposite the drive roller 28, to contact with the embossed characters 20 as the card 15 moves within the card slot 75. The cover plate 77 is attached to the housing top portion 65 by screws 180 and retains and protects the read head subassembly 25, pinch rollers 85, gears 110, and optical encoder 100.

The embossed card reader 10 also includes a manual ejector mechanism comprising an ejector bar 190, cap 78, compression spring 200, retention tab 205, and torsion spring 210. The ejector bar 190 is housed between the top portion 65 and bottom portion 70 of the housing. The cap 78 occupies notches 215a,b defined in the top portion 65 and bottom portion 70, respectively, so that it is basically flush with the front surface of the terminal in which the embossed card reader 10 is installed. The operation of the ejector mechanism is described in greater detail below.

The preferred housing comprising housing top portion 65 and housing bottom portion 70 are formed of injection-molded plastic. As can be seen in FIG. 3, the housing bottom portion 70 includes a plurality spring tabs 220 for slightly elevating the card 15 away from the interior surface of the bottom portion and minimizing the friction between the card 15 and the interior surface of the card slot 75. The spring tabs 220 comprise elongate cantilevered rectangles that are integrally attached at one end to the plastic of the housing bottom portion but whose opposite free or unattached ends are free to bend into and out of the plane of the bottom portion, with slightly rounded "pillows" at the free end for contacting with the card. The "pillows" bias the card upwardly, toward the pins of the read head subassembly. In the preferred embodiment, there are two pairs of spring tabs 220, one pair is disposed before the drive roller 28 and the second pair disposed after the drive roller.

The linear movement of the card 15 within the card slot 75 is limited on the interior end by a rib 225 defined at the end of the housing bottom portion 70. Under normal operation, however, the card will not leave contact with the drive roller 28, and will not encounter the rib 225.

Figure 4:
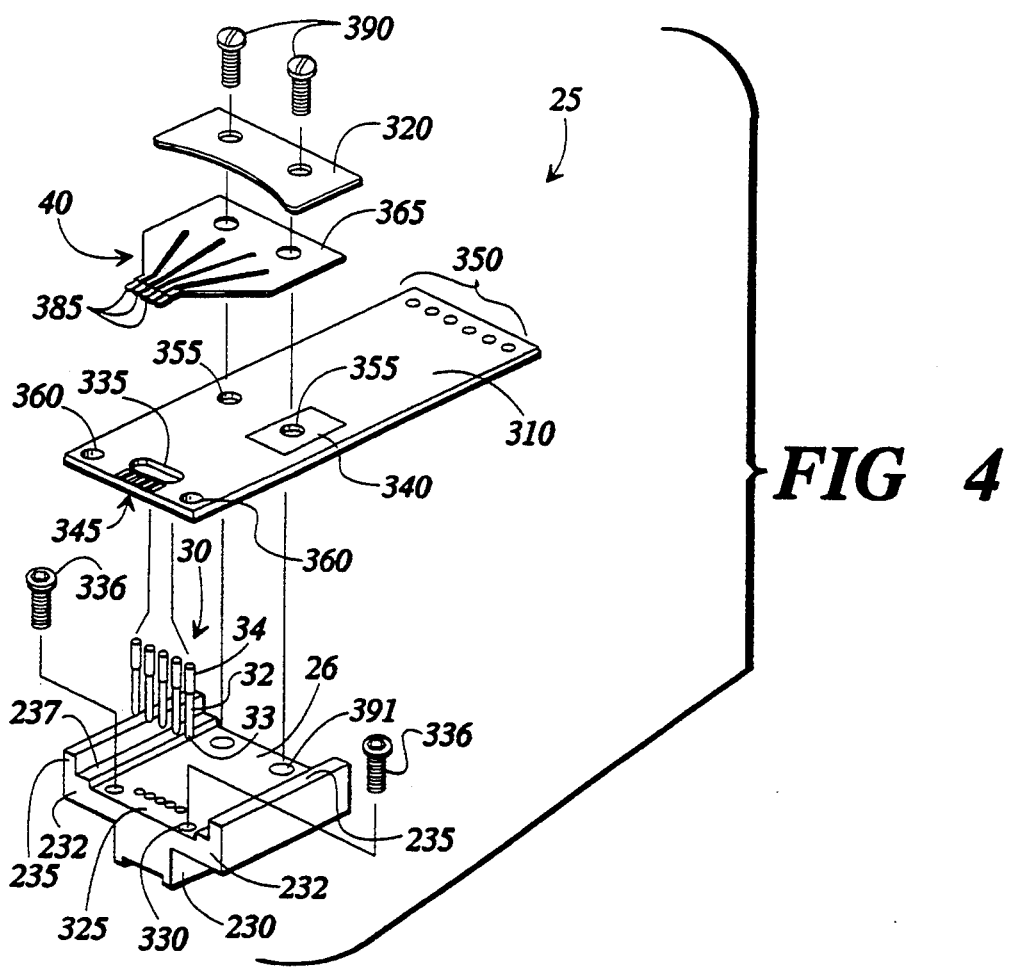
FIG. 4 is an exploded perspective view of the read head subassembly utilized in the preferred embossed card reader shown in FIG. 3.

FIG. 4 is an exploded view of the read head subassembly 25. The read head subassembly includes a read head housing or support block 26, read head pins 30, a printed circuit board 310, a conductive leaf spring 315, and a clamp 320. The pins 30 are generally of a cylindrical shape. The bottom end of a pin is rounded at the tip 33 and forms a contact portion 32. The upper end of the pin has a slightly larger diameter than the contact portion and forms a support portion 34.

As best seen in FIG. 6, the support block 26 includes five cylindrical bores 325. The bores 325 have a uniform diameter slightly smaller than the support portions 34 of the pins 30. Thus, the pins 30 are supported at the top of the bores 325. The narrower contact portions 32 of the pins 30 extend through and are slidably housed within the bores 325.

Referring again to FIG. 4, the read head subassembly 25 further comprises a printed circuit (PC) board 310 including a pin cavity 335 through which pins 30 extend. When the printed circuit board 310 is mounted on the support block 26, the pin cavity 335 is positioned adjacent the bores 325 so that the support portion 34 of the pins extends through the cavity. Printed circuit board 310 includes a ground pad 340 and five signal pads 345, one for each pin. Wires 350 are soldered to pads at one end of the board and carry signals indicative of the state of a pin—raised when in contact with embossing, lowered when not in contact. Traces on the printed circuit board 310 connect each of the signal pads 345 and the ground pad 340 to one of the wires 350.

Figure 10:
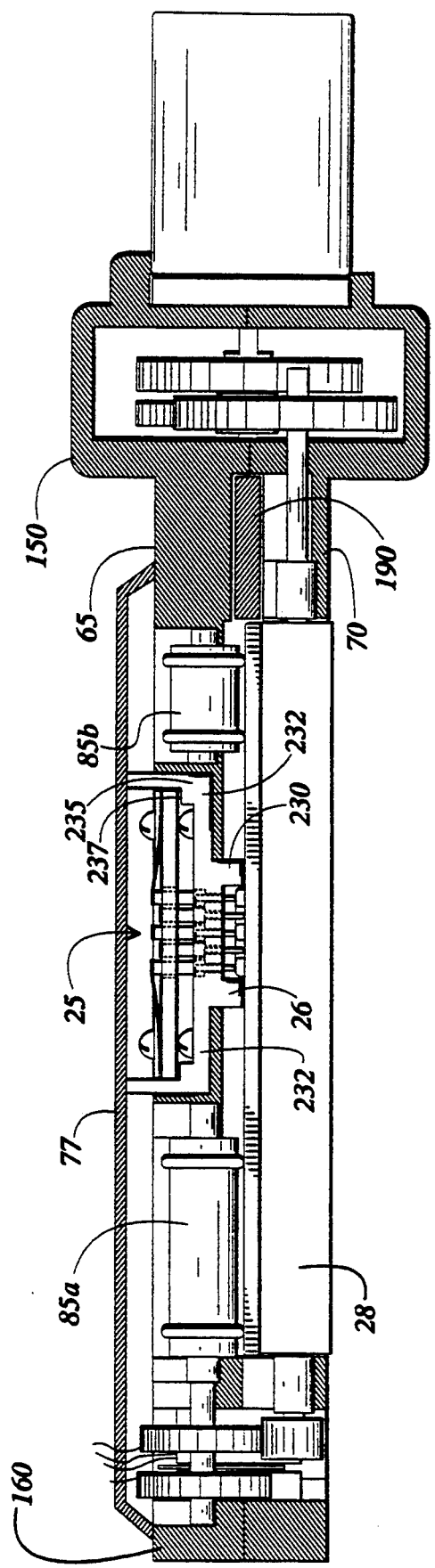
FIG. 10 is a cross-sectional view of the preferred embossed card reader taken along the line 10—10 of FIG. 2.

As also seen in FIG. 10, the support block 26 comprises a downwardly extending read head portion 230 that extends into the void formed between the upper housing portion 65 and lower housing portion 70. Extending outwardly from the read head portion 230 are a pair of support wings 232 that rest upon and are supported by top housing portion 65. At the outermost periphery of the support block 26 are upwardly extending cover support rails 235 that engage with the cover 77. The cover 77, when fastened into place, thereby securely holds and retains the support block 26 in operative position for reading the embossing.

The printed circuit board 310 rests upon a pair of support shelves 237 formed in the support block, positioned immediately inwardly of the cover support rails and extending upwardly from the support wings 232.

Returning now to FIG. 4, the printed circuit board 310 includes mounting holes 355 and adjusting holes 360. The adjusting holes 360 are aligned with threaded holes 330 provided in the upper surface of the support block 26 and allow access to height adjusting screws 336. The diameter of the adjusting holes 360 is slightly smaller than the heads of the adjusting screws 336. The printed circuit board 310 rests on the heads of the screws 336. Adjusting holes 360 allow a small screwdriver or allen wrench to be extended through the holes to adjust screws 336. By adjusting the height of the PC board 310 relative to the support block 26, and thus to the top of the pins 30, the travel distance for the pins 30 to the point of contact with the fingers 40 can be adjusted, to compensate for minor variations in the thickness of the support block 26, the PC board 310, and the length of the pins 30.

Figure 5:
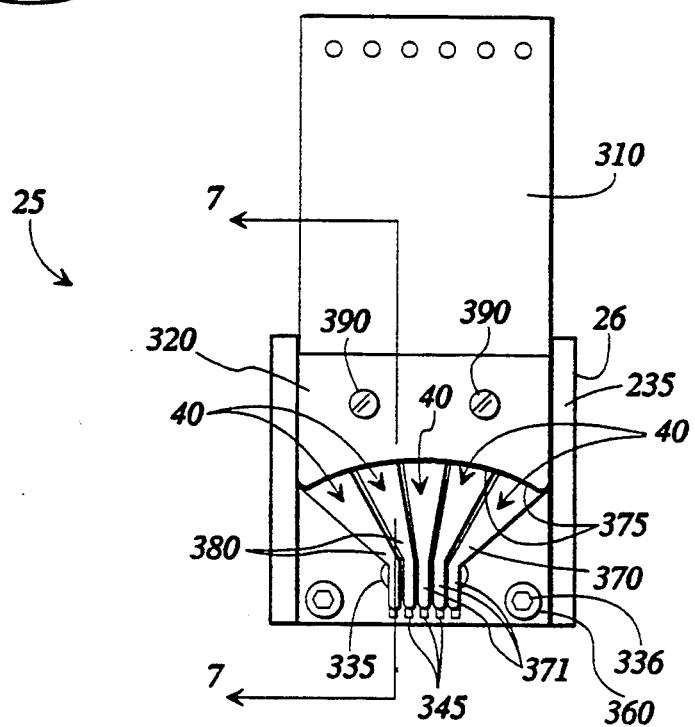
FIG. 5 is a top plan view of an assembled read head subassembly of FIG. 4.

Still referring to FIGS. 4 and 5, the read head subassembly 25 also includes a conductive leaf spring 315, having fingers 40 that contact with the tops of the pins extending through the cavity 335 in the PC board 310. The leaf spring includes an enlarged body portion 365 having a generally rectangular shape, with the plurality of fingers extending therefrom. Each of the fingers 40 has a triangular portion 370 having a generally triangular shape and an elongate end portion 371 that extends over the pin cavity 335 and contacts with the pins 30. Each of the triangular portions 370 of the fingers 40 includes a base 375 integrally connected to the body 365, and an apex 380 at its end opposite the connection to the body; the elongate end portion extends from the apex 380. Each finger 40 also includes an endpoint 385 that extends over a signal pad 345 on the PC board, on a side of the cavity 335 opposite the point of attachment of the leaf spring.

The leaf spring 315 is affixed to the PC board 310 by screws 390, which extend through a clamp 320 and are received in threaded bores 391 provided in the upper portion of the support block 26. As best seen in FIG. 5, the clamp 320 has an arcuate front edge 323 positioned adjacent the base portions 375 of each finger 40, to provide a fulcrum or pivot point for the finger when it is moved by its corresponding pin.

When the leaf spring 315 is attached to the printed circuit board 310, the body 365 is in contact with ground pad 340. The endpoints 385 of the fingers 40 are in contact with signal pads 345, and the end portion 371 of the fingers is positioned directly above the pin cavity 335 and pins 30. Together, the printed circuit board 310, leaf spring 315, and pins 30 form a "normally closed" (NC) electrical switch, the operation of which is described in conjunction with FIGS. 6A–6B.

As best seen in FIG. 6A, when a pin 30 is not contacting with an embossing on card 15, the rounded endpoint or tip 33 of the pin is biased downward against the surface of the card by the finger 40 of the leaf spring 315. In FIG. 6B, when the embossing 20 is encountered, the pin 30 is lifted up, against the bias of the spring, lifting the endpoint 385 off of the signal trace 345 on the PC board 310, breaking the electrical contact. It will be appreciated that the structure described is a cantilever arrangement wherein the finger 40 is attached at the base portion 375 and permits the motion of the pin between the point of attachment at 375 and the endpoint 385 to amplify the travel of the pin. This produces a greater travel for the switch contact at the endpoint 385 than the structure described in U.S. Pat. No. 3,806,707, and thereby makes an embossed card reader constructed in accordance with the present invention more sensitive, with greater ability to resolve height differences in the embossing.

Figure 7:
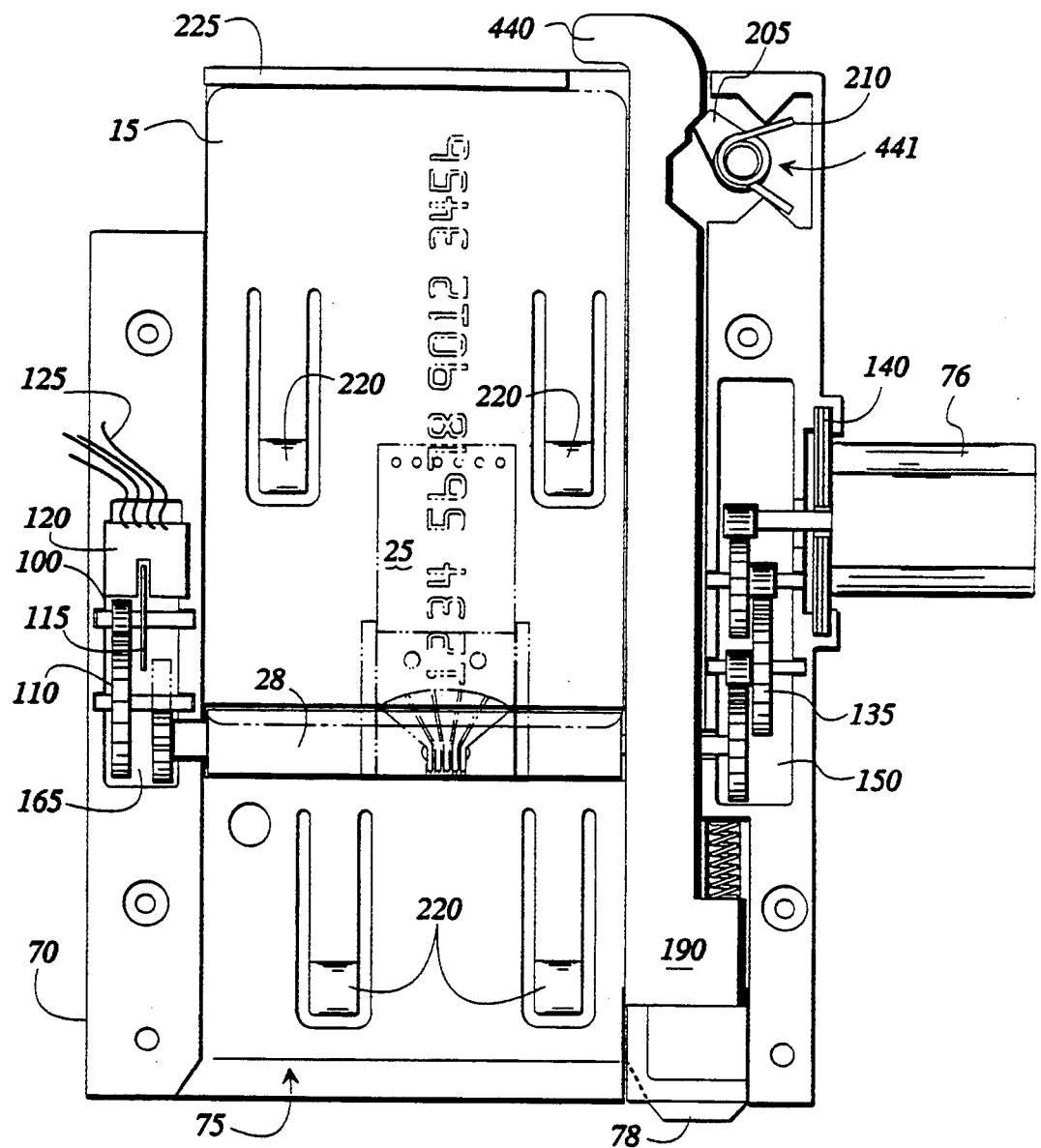
FIG. 7 is a top plan view of the interior of the bottom portion of the housing, and associated components.

FIG. 7 is a top plan view showing the interior of the housing bottom portion 70 and the arrangement of the components of the embossed card reader 10. A credit card 15 and the read head subassembly 25 are indicated in phantom for reference, although it will be understood that the read head subassembly is preferably mounted in the housing top portion 75. The card 15 is shown in the back of slot 75 against the rib 225.

FIG. 7 also illustrates the structure and location of the ejector mechanism, for removing a card in the event of malfunction. An elongate ejector bar 190, having a tab or hook 440 for engaging with a card on one end, is positioned parallel to card slot 75. A cap 78 affixed to the other end of the bar 190 is positioned so as to be basically flush with the front panel of a terminal. The retention tab 205 and torsion spring 210 are housed within a cavity 441 formed in the housing bottom portion 70.

Figure 8:
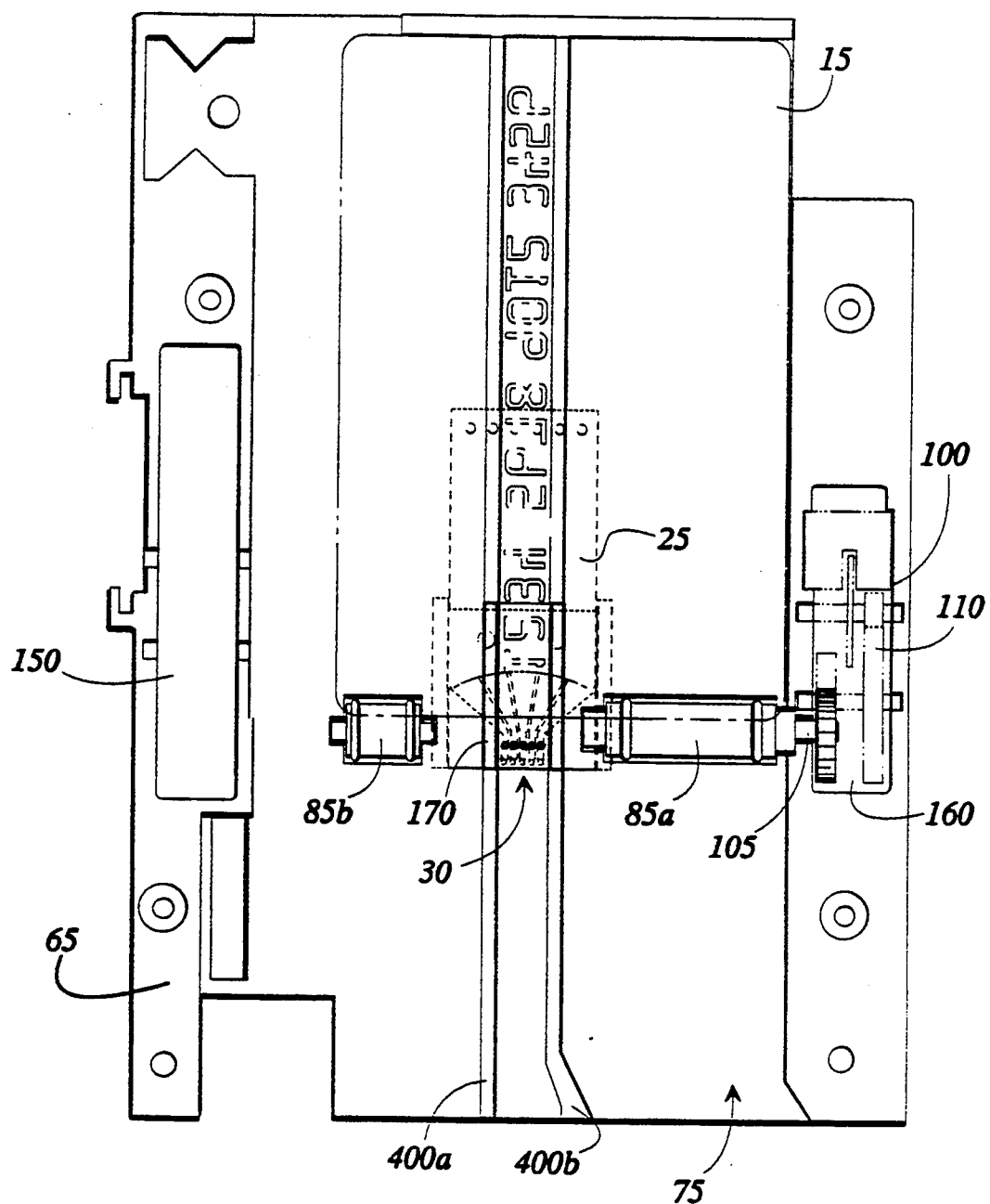
FIG. 8 is a bottom plan or "worm's eye" view of the interior of the top portion of the housing, and associated components.

FIG. 8 is a bottom plan or "worm's eye" view looking upward at the interior of the top housing portion 65. A credit card 15 and the read head subassembly 25 are indicated in phantom for reference. The credit card 15 is shown in the back of the card slot 75. In order to accommodate credit cards having slightly different spacings between the embossed characters and the edges of the card, the preferred top housing portion 65 includes guide rails 400a, 400b that guide the tops and bottoms of the embossed characters 20 along a path adjacent to the read head subassembly 25. Guide rail 400b diverges from guide rail 400a at the entrance to the card slot 75 in order to provide a fluted entry area for the embossed characters 20. The preferred guide rails 400 provide for easy insertion of the card 15 into slot 75, and for quick alignment of the characters 20 with the read head subassembly 25.

FIGS. 9A and 9B illustrate the operation of the manual ejection mechanism as viewed looking downward toward the housing bottom portion 70. In FIG. 9A, a credit card 15 is located in card slot 75 and is resting against the rib 225, such as might occur in the event of a card jam. If the motor 76 fails or the gears 135 bind, the ejector may be used to manually extract the credit card 15 from the card slot 75.

FIG. 9A illustrates the ejector bar 190 in its retracted or starting position. In this position, cap 78 is basically flush with the front of the embossed card reader 10. A detent mechanism is provided in order to retain the ejection bar 190 and keep the cap 78 flush when not in use, and to extend the ejector bar 190 and cap 78 so that it may be grasped when the operator needs to eject the credit card 15.

The ejector bar 190 is held in its recessed position by a retention tab 205 pivotably mounted toward the back of the housing bottom portion 70 that engages with a detent notch 430 in the ejector bar. The retention tab 205 is biased inwardly (that is, away from the card slot opening 75) by a torsion spring 210. In its neutral or rest state (not shown), the retention tab 205 is biased by torsion spring 210 so that the tab points in a direction perpendicular to the direction of movement of credit card 15 within the card slot 75.

A compression spring 200 is positioned in a cavity in the housing bottom portion 75 between an enlarged region of the ejector bar 190 near the cap 78 and the plastic material defining the gear housing 150b. The compression spring 200 forces the ejector bar 190 outwardly from the card reader when released, as described below.

When ejection bar 190 is inserted into slot 75, an edge 425 forces the retention tab 205 to move in the direction of travel of the ejection bar 190. The torsion spring 210 biases the retention tab 205 into the detent notch 430 as the ejection bar 190 moves toward the rear of the card slot 75. At this point, the ejection bar is held in the retracted position until needed.

When it becomes necessary to manually eject a credit card, the operator pushes on cap 78. This causes an unlocking notch 435 to move adjacent to retention tab 205. At that point, torsion spring 210 forces retention tab 205 into the unlocking notch 435. This provides sufficient clearance for the compression spring 200 to cause ejector bar 190 to move outward and cap 78 to protrude far enough that the operator may grip the cap. This position is illustrated in FIG. 9B.

As the operator pulls on the ejection bar 190, the hook 440 engages the credit card 15 and moves it toward the opening of card slot 75. The detent notch 430 and edge 425 rotate the retention tab 205 in a counter-clockwise motion so that the edge 425 clears retention tab 205.

When the card is moved far enough to cause its edge to protrude from card slot 75, the retention bar 190 has moved past the retention tab 205, leaving the tab is biased in its quiescent position perpendicular to the movement of a credit card within the card slot 75. The ejector may then be reset by pushing the ejector bar 190 back into the slot and causing the retention tab 205 to engage and hold the detent notch 430. Those skilled in the art will appreciate that this manual ejection mechanism provides a simple and efficient way to provide for the removal of cards in the event the motor 76 and/or gears 135 fail and the credit card is not automatically ejected from the machine upon completion of a card read cycle.

The cross sectional front view of FIG. 10 more clearly illustrates the manner in which the ejector bar 190 is "sandwiched" between the housing top portion 65 and housing bottom portion 70. FIG. 10 also illustrates the relative spacings and positions of the idler or pinch rollers 85, drive roller 28, drive gear housing 150, optical encoder gear housing 160, and read head subassembly 25.

Controller

Figure 11:
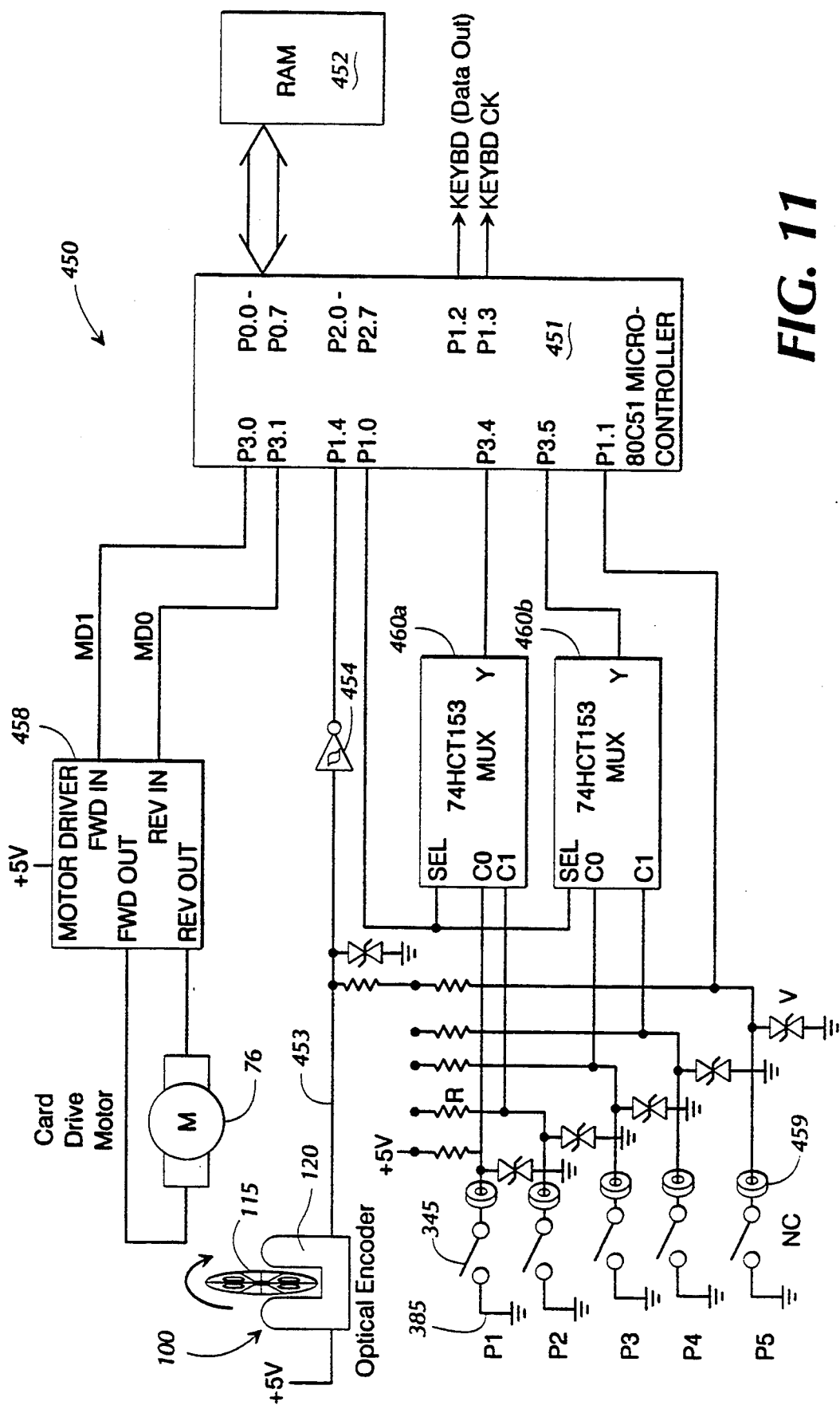
FIG. 11 is a schematic diagram of the electronic control circuit employed in the preferred embossed card reader of FIG. 2.

FIG. 11 illustrates a controller circuit 450 that is employed in the preferred embossed card reader 10 for detecting the actuation of the switches P1–P5 formed by the contacting of the end point 385 of a leaf 40 and a ground signal pad 345. The controller circuit for 450 is preferably mounted on a separate printed circuit board in a location nearby the embossed card reader, with appropriate signals carried to the reader with electrical connectors.

The preferred controller circuit 450 is constructed around a type 80C51 8-bit microcontroller 451 manufactured by Intel Corporation, Santa Clara, Calif., programmed and configured for input/output functions. Details of the preferred microcontroller are available in the literature supplied by the manufacturer. In particular, however, it should be understood that the microcontroller 451 includes on-board ROM for program storage. An 8K byte external RAM 452 is provided for storage of data for purposes of decoding characters read by the embossed card reader 10. The microcontroller 451, as will be understood by those skilled in the art, includes a plurality of eight bit input/output ports P0-P3, with data lines corresponding to those ports P0.0-P0.7, P1.0-P1.7, P2.0-P2.7, and P3.0-P3.7; these ports are used in the known manner for receiving data and for transmitting data.

The optical interrupter 120 in the optical encoder 100 is connected via line 453 via a Schmitt trigger 454 to the port line P1.4 of the microcontroller, and provides a signal in response to the movement of the slotted disk 115 indicative of the insertion of a card, as previously described. The preferred optical interrupter 120 is a type OPB821-S5 manufactured by Optek.

A motor driver circuit 458 is employed for driving the motor 76. The preferred motor is a model DN22-R1N1B five-volt bidirectional motor, manufactured by Canon USA. As will be understood by those skilled in the art, providing +5 V power to one terminal of the motor causes it to rotate in one direction, while providing +5 V to the other terminal causes rotation in the opposite direction. The preferred motor driver circuit 458 comprises conventional driver transistors connected in a conventional push-pull arrangement, with one output FWD OUT being connected to one terminal of the motor and another output REV OUT being connected to the other motor terminal. The motor driver circuit has a forward direction input (FWD IN) and a reverse direction input (REV IN), which are connected output port lines P3.0 and P3.1, respectively, of the microcontroller 451, which provides motor drive signals MD1 and MD0, respectively, on these port lines to cause the motor to rotate.

The switches P1-P5 actuated by the pins 30 are normally closed (NC) momentary SPST, and have one terminal commonly connected to a ground of the PC board via the endpoint 385 of each of the fingers of the leaf switch 40. The other terminal of the switch is formed by the pads 345 on the PC board. Each pad 345 is pulled up to +5 V through a pull up resistor, and protected from static charges which might be present on a card by a varistor V connected to ground. The preferred varistors V are type 911-36290-046 manufactured by Philips. Additional protection against electrostatic discharge is provided by ferrite beads 459 connected in series with switches P1-P5, and mounted on the PC board 310.

The switches P1 and P2 are connected to the inputs C0 and C1, respectively, of a type 74HCT153 data selector circuit 460a, whose output Y is connected to a port input P3.4 of the microcontroller 451. Likewise, the switches P3 and P4 are connected to the inputs C0 and C1, respectively, of a type 74HCT153 data selector circuit 460b, whose output Y is connected to a port input P3.5 of the microcontroller 451. The switch P5 is connected to a port input P1.1 of the microcontroller. A selection line signal for the data selectors 460 is provided from an output port P1.0 to the select inputs SEL, allowing selection of the switches P1-P4 for reading under program control.

It will be understood that the microcontroller 451 is operative, during a card read cycle, to sample the port lines P3.4, P3.5, and P1.1 under program control, to determine when a transition might occur. At such time as one of the pins is elevated sufficiently by the passage of an embossment thereunder, its respective switch P1-P5 will open, placing a logical "1" or high voltage level on the respective pads 345, which can then be read as a "1" by the program. A switch that is not actuated will provided a logical "0". As further described below, the microcontroller is responsive to any transition on any of these input lines P3-P7 to begin a character read and decode operation or cycle. During a character read cycle, the microcontroller reads and stores data indicative of the state of the switches and decodes the characters. During a card read cycle, the preferred controller circuit samples switches P1-P5 at a sampling rate of approximately 10 kHz.

After decoding a numeral or character, the microcontroller 451 provides serial data corresponding to the decoded character. The serial data and associated clock signal are output on pins P1.2 and P1.3, respectively, and are provided to terminal controller means (not illustrated) contained in the apparatus with which the embossed card decoder is associated, such as a credit card transaction terminal as is illustrated generally in FIG. 2. It should also be understood that the control circuitry 450 illustrated in FIG. 11 may also be programmed and utilized for magnetic stripe decoding, with the addition of circuitry of reading the signals from a magnetic stripe reader. Suitable such terminal controller circuitry and magnetic stripe decode circuitry is described in copending U.S. patent application Ser. No. 07/820,401, filed Jan. 10, 1992, entitled "Data Card Terminal With Embossed Character Reader and Signature Capture", assigned to the same assignee as the present invention, the disclosure of which is incorporated herein by reference and made a part hereof. Those skilled in the art will understand that the present invention of an embossed card reader 10 is suitable for use as the embossed card reader described in the incorporated patent application.

Operation

FIGS. 12A-12D are partial cross-sectional views of the preferred embossed card reader 10, illustrating the embossed card reader 10 and the path of travel of a credit card 15 during an embossed card read cycle. When a card is first inserted in the reader as in FIG. 12A, it engages with the idler roller 85a (not shown) connected to the optical encoder 100 (not shown). Signals from the optical encoder trigger the activation of the electric motor 76 (not shown) and cause the drive roller 28 to begin turning to begin a card read cycle. During the card read cycle, the credit card 15 is pulled all the way into the card slot 75 by the drive roller 28.

Figure 12A:
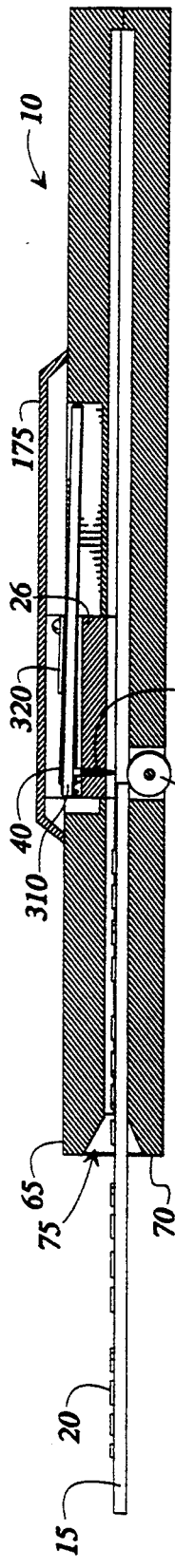
FIGS. 12A-12D are cross-sectional views of the preferred embossed card reader of FIG. 2 taken along the line 12—12 of FIG. 2, showing the movement of a card through the reader during a card read cycle.

In FIG. 12A, the credit card 15 has just been inserted in the card slot 75. At this point, pins 30, being biased downwardly by the leaf spring, are at their lowest position and the endpoints 385 of each leaf spring finger 40 are in contact with the pads 345 on the PC board 310. As a result, the electrical switch formed by the PC board 310 and leaf spring finger 40 is closed. When all of the switches formed by the leaf spring fingers are closed, the electrical signals define a common state of all zeroes ("0"), indicating that the read head subassembly 25 is not presently in contact with any embossed character.

Figure 12B:
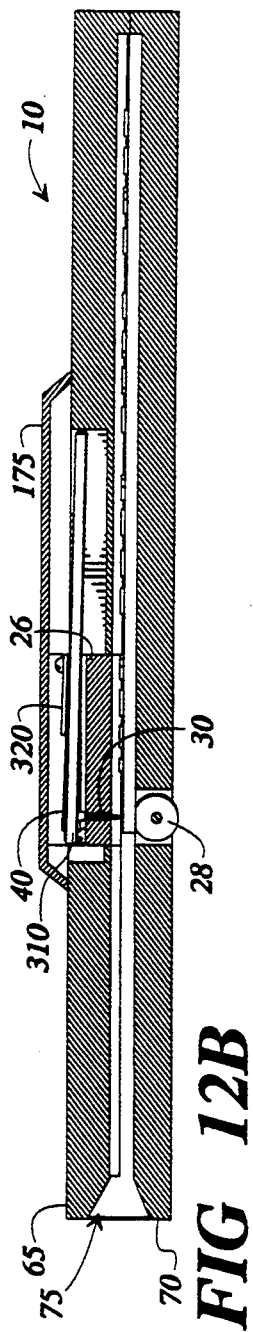

FIG. 12B illustrates the position of the card 15 after it has been pulled completely into card slot 75 by drive roller 28. At this point, the embossed characters 20 have been read by read head assembly 25 as the card 15 passed beneath the read head. This data is stored in RAM 452 and will be post-processed and decoded after the card 15 is ejected from card slot 75. This process is described more completely below.

As described above, the optical encoder 100 (not shown) is connected to idler roller 85a (now shown) and provides electrical signals by which the movement of the card can be measured. By counting the pulses received from the encoder, the controller circuit 450 will cause drive roller 28 to drive the card completely into card slot 75. After the card has travelled a predetermined distance, the controller circuit 450 causes the direction of rotation of the motor to be reversed. The card 15 is thusly driven back toward the opening of the card slot 75.

Figure 12C:
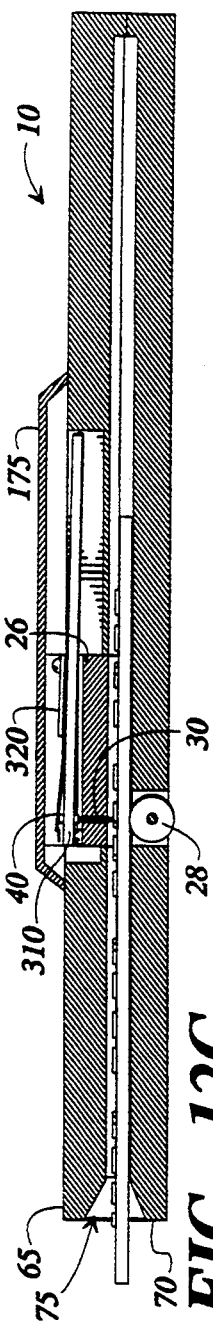

As indicated in FIG. 12C, on the card's way out, the read head subassembly 25 is operative to read the embossed characters 20 on the card, until all characters have been read. This series of data is also stored in RAM 452 and is post-processed and decoded after the card 15 is ejected.

Figure 12D:
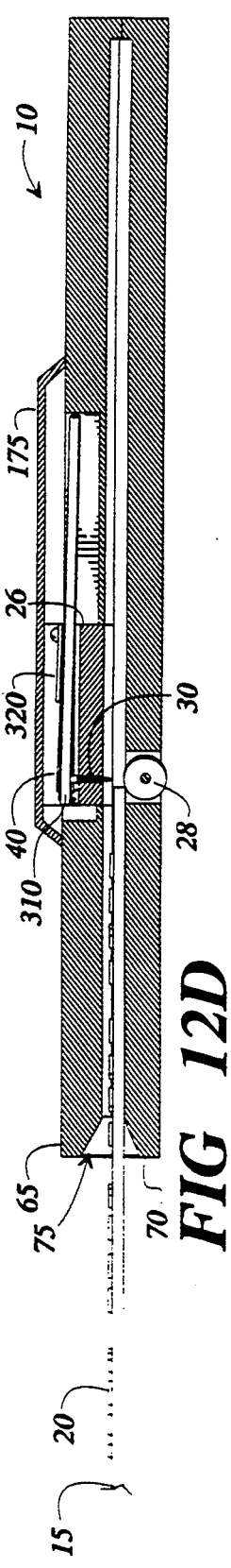

After all the embossed characters have been read, the read cycle terminates. The controller is operative to measure the distance the card has travelled and to stop rotation of the motor before the card leaves contact with the roller 28, as shown in FIG. 12D. Thus, the card will be frictionally retained on the roller for manual removal. The controller, it will be noted, is programmed to ignore signals from the optical encoder generated by reverse movement of the card, so that a new read cycle is not triggered as the card is removed.

Character Decoding

The method by which the embossed character data is acquired, filtered, and decoded will be described in conjunction with FIGS. 13-19. Prior to describing the specifics of the preferred algorithms, however, it is helpful to consider generally the process by which the embossed characters may be decoded, and the data that would be acquired if the embossed characters 20 on the card were perfectly formed and the read head assembly 25 was able to read the embossed characters without any switch bounce or other electrical noise.

Figure 13:
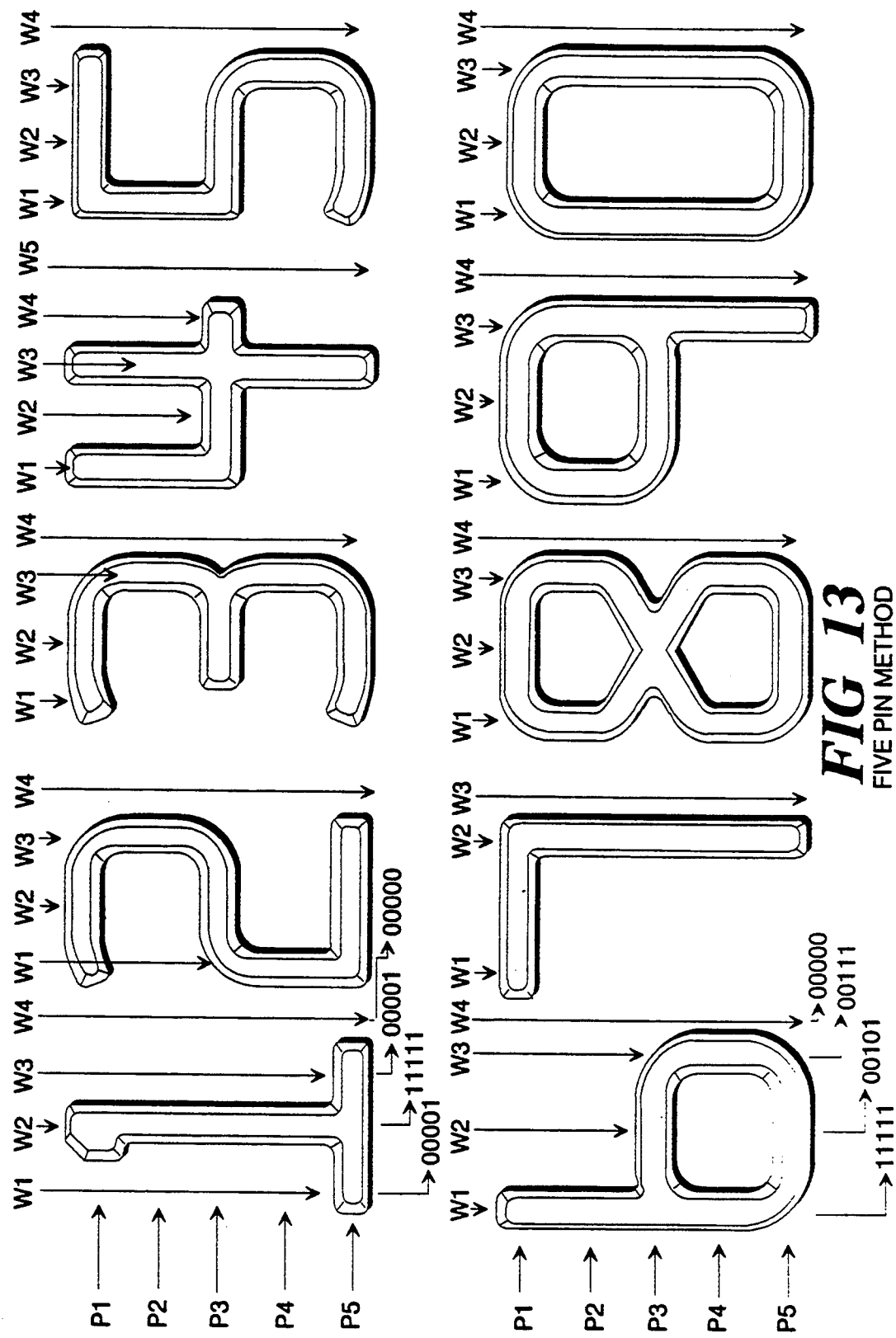
FIG. 13 illustrates the Farrington 7B numerical character set which the preferred embossed card reader is operative to read, and the data windows of various portions of the numerals as used in a five-pin reader.

FIG. 13 illustrates the Farrington standard numerals 1, 2, 3, 4, 5, 6, 7, 8, 9, and 0. Each of the pins P1-P5 defines a track extending horizontally across the numerals in the direction of travel of the card 15 into the reader. Thus, each numeral is read from right to left as the card 15 is pulled into the card slot 75, and from left to right as the card is ejected from the card slot. The five pins define a plurality of tracks P1-P5 corresponding to the pin switches, with track P1 extending across the topmost segment, P2 extending across the upper central segment, P3 extending across the central segment, P4 extending across the lower central segment, and P5 extending across the bottommost segment.

Each character has a predetermined plurality of data windows $W_1$ through $W_n$. These data windows are indicated by the vertical lines associated with each character illustrated in FIG. 13. As described above, when the pins 30 are not in contact with the embossed characters 20, the switches forming a portion of the read head assembly 25 are closed and a common state defined by a logical "0" on each of the pins P1-P5 is detected by the controller circuit 450. Similarly, when a pin is in contact with an embossed character, the controller circuit will detect a logical "1". Thus, the transition from a blank space to an embossed character is defined by the controller circuit 450 detecting a transition from a common state to a state having a "1" on any of the pins P1-P5. The first data window is defined as $W_1$. Each subsequent data window $W_i$ is defined by a transition on any of the pins P1-P5.

For the exemplary numeral one (1) shown in FIG. 13, the data window $W_1$ is defined by the five bits 00001, with the leading "0" corresponding to the switch P1 and the trailing "1" corresponding to the switch P5. The next transition occurs when the switches P1-P4 encounter the upright portion of the numeral. Thus, the data window $W_2$ is formed, which for the numeral "1" consists of 11111. The next window $W_3$ is formed when the switches P1-P4 move off the upright portion of the numeral "1" and into non-embossed area. This results in the data window $W_3$ consisting of the bits 00001. Finally, after the switch P5 has reclosed and the pins P1-P5 are no longer in contact with the numeral, the data window $W_4$ is formed, consisting of the common state (00000). This data set uniquely identifies the characteristics of the numeral "1". The common state indicates that the character has been read and the pins are in contact with the blank space between characters. At this point, the controller circuit continues to sample the pins P1-P5 until data window $W_1$ of the next character is detected.

Still referring to FIG. 13, it will be seen that the data window $W_1$ for the numeral "6" consists of the five bits 11111, followed by $W_2$ at 00101, $W_3$ at 00111, and $W_4$ at 00000.

From the foregoing discussion and inspection of FIG. 13, those skilled in the art will be enabled to determine the data windows $W_1$-$W_n$ for the remaining numerals, which vary from three windows for the numeral "7" and five windows for the numeral "4".

Figure 14:
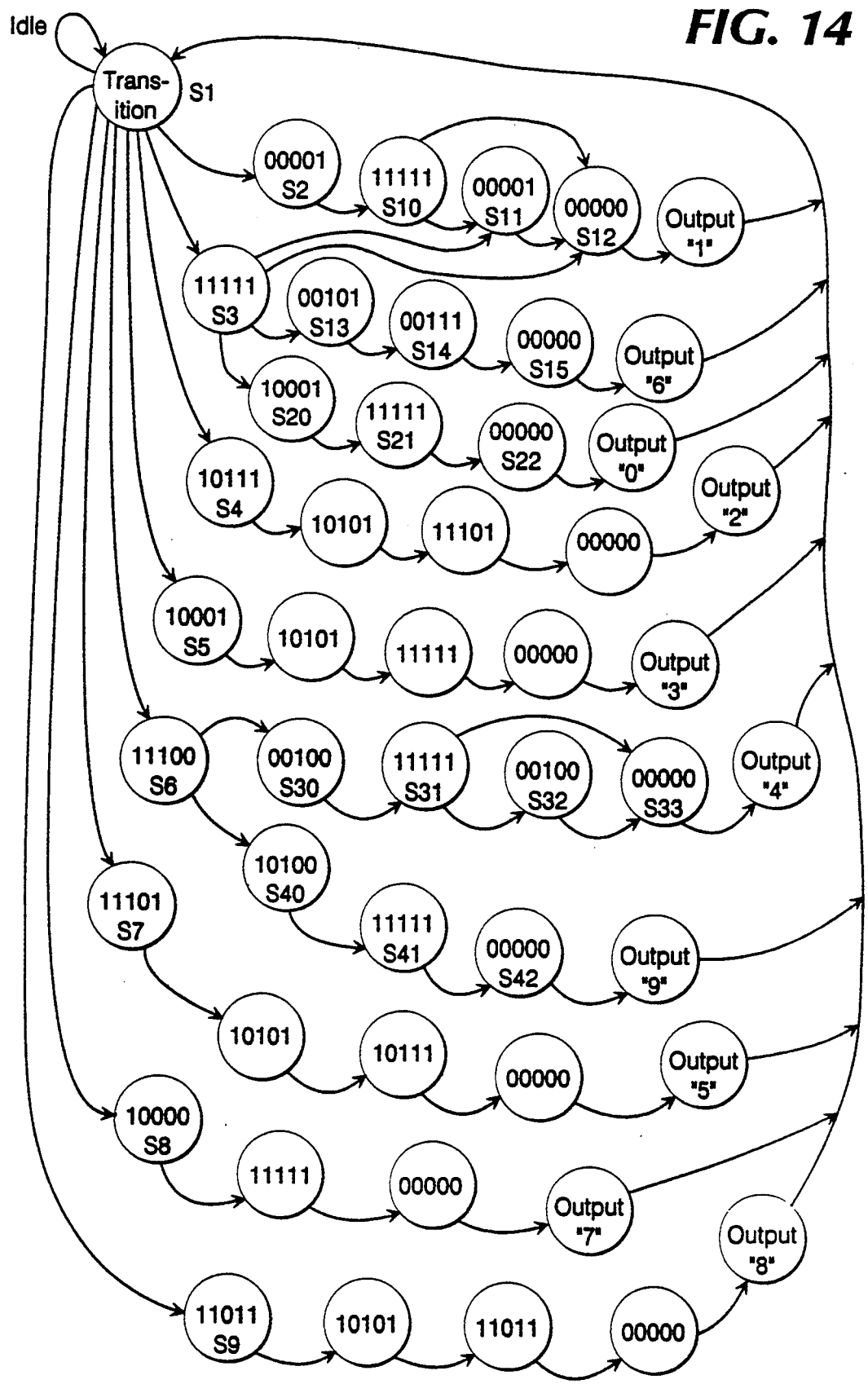
FIG. 14 is a state diagram illustrating the general principles of operation of a computer program for the control circuit of FIG. 11 for decoding the Farrington 7B numerals, in a five-pin embossed card reader.

Turning now to FIG. 14, a state diagram illustrative of a method for decoding the exemplary characters of FIG. 13 is provided. Although the present state diagram would adequately provide for the decoding of clean data from embossed characters that conform to the exemplary characters illustrated in FIG. 13, the present inventors believe it is necessary to provide additional steps for detecting damaged characters and debouncing or filtering erroneous data. These additional steps will be described below. At this point, however, it will be understood that in order to properly decode a numeral from a set of data windows $W_1$-$W_n$, a certain sequence of bits must occur. In other words, given the numeral "1", $W_1$ must be 00001, followed by $W_2$ at 11111, followed by $W_3$ at 00001, followed by $W_4$ at 00000 at the trailing edge or end of the character. If this sequence does not occur, a "1" is not detected. Only a certain predetermined set of valid sequences can occur for the Farrington data set. Likewise, for other fonts, alphabets, typestyles, etc., certain patterns of bits must precisely follow other patterns of bits, or the decoding is not valid.

In the preferred embodiment, the sequences of bit patterns are stored in a table in the microcontroller's ROM, and are indexed or examined as a state table. That is, once a certain bit pattern is detected, only certain other bit patterns are expected for valid characters. If the proper patterns occur in the proper sequence, a character is decoded and provided as an output. On the other hand, if the bit patterns in the data windows $W_1$-$W_n$ do not occur in the proper order or sequence, an error condition is indicated and no valid character is output.

Beginning in the upper left-hand corner of the FIG. 14, the "transition" state S1 represents the quiescent or common state and loops back upon itself until a transition is encountered. For the previously discussed example for the numeral "1", the data window $W_1$ will be 00001. If 00001 is read, the program advances to state S2. Eight (and only eight) possible states S2-S9 can occur from S1, as shown. Any other bit patterns are ignored as invalid. If state S2 is reached, the only other valid data window expected is 11111. Thus, if data window $W_2$ is 11111, the program advances to state S10. From state S10, the only valid data window expected for $W_3$ is 00001. If $W_3$ is 00001, the program advances to state S11. Upon encountering 00000 for $W_4$, the numeral is finished, and the decoding complete. The microcontroller 451 outputs the numeral "1" as the decoded data.

The occurrence of any data other than expected results in a return to state S1, awaiting data. It should be understood that the exit of the program from a state where it received invalid data constitutes an error condition, which may be indicated by the microcontroller with a status signal. It is of course conceivable that a worn or damaged or fraudulently altered card will result in the provision of an unexpected data window and the resulting exit from any of the valid states illustrated.

It will also be understood by those skilled in the art that the degree of sensitivity or robustness of the present invention may to some degree be altered by providing more or fewer exit paths to an error state. For example, for the numeral "1" it might be expected that the lower serif, either leading or trailing, may be damaged or worn, and the data window $W_1$ of 00001 not encountered. It will be observed from an inspection of FIG. 14 that the numerals "1" (without serif), "6", and "0" all will provide a data window $W_1$ in the forward direction of 11111. By providing the exit paths from the states S3 and S10 to the state S12, and/or from S3 to S11, the leading and trailing lower serifs of the numeral "1" can be ignored, thereby allowing the present invention to successfully read a numeral "1" if either (or both) the lower serifs are missing, damaged, or worn. The tradeoff for providing alternative exit paths from various states is of course a greater likelihood that a fraudulent or worn card will be misread. (The modulo 10 checksum, however, provides some additional protection in this regard.)

It will be understood that all possible exit paths from all possible states shown in FIG. 14 are not shown. Those skilled in the art, after the discussion above, will be enabled to determine which exit paths, if any, are desirable for a given application of the present invention.

When applying the data derived at each possible initial window $W_1$ to the state diagram of FIG. 14, it will be seen that there are eight lead-off or leading data windows $W_1$, comprising 00001, 11111, 10111, 10001, 11100, 11101, 10000, and 11011. From an inspection of FIG. 14, and upon application of the present invention to other fonts and/or alphabets, it will be realized that certain characters are ambiguous until subsequent data windows provide additional data. Take for example the numerals "6" and "0". Each of these produces an initial data window $W_1$ of 11111. To decode a "6", the state following S3 would be 00101 (leading to state S13), followed by 00111 (leading to state S14), followed by 00000 (leading to state S15). On the other hand, to decode a "0" the data window 10001 must follow the 11111 of state S3 (leading to state S20), followed by a 11111 (leading to state S21), followed by 00000 (leading to state S22).

Another potential ambiguous circumstance occurs for the numerals "4" and "9". The initial data window $W_1$ of 11100 leads to state S6 for each character. For the numeral "4", the subsequent states are S30 (00100), followed by S31 (11111), followed by S32 (00100)(for the trailer of the central segment), followed by S33 (00000). To ignore the trailer of the central segment, state S31 can lead directly to state S33.

For a "9", state S6 is followed by state S40 (11100), followed by state S41 (10100), state S42 (11111), and state S43 (00000).

Those skilled in the art will understand that the data provided by pins P1–P5 may be decoded in a variety of ways, and that other state diagrams similar to that illustrated in FIG. 14 may be constructed to illustrate those methods. For example, character data may be decoded by reading the data from pins P1–P5 in a backward direction. In addition, the characters may be decoded by relying only on data from pins P1–P3 and reading it forward or backward. One skilled in the art will be able to construct state diagrams representative of these and other decode algorithms.

Those skilled in the art will understand that state diagrams similar to that illustrated in FIG. 14 can be constructed for decode algorithms based on different combinations of data from pins P1–P5. For example, characters may be decoded by reading data in a backward direction in accordance with a state diagram.

As discussed above, an algorithm corresponding to the state diagram illustrated in conjunction with FIG. 14 would be adequate to decode data detected from cards having perfectly formed embossed characters. However, embossed characters actually found on credit cards are seldom perfectly formed, and are often damaged as a result of wear. In addition, the switches contained in the read head assembly 25 are subject to switch bounce and may provide erroneous data to the controller circuit. Thus, it is desirable to provide an algorithm having additional features that filter or debounce the data received from the read head assembly. In addition, it is desirable to provide a robust algorithm capable of correctly decoding characters having damaged or deformed segments that no longer conform to the exemplary characters of FIG. 13.

Figure 15A:
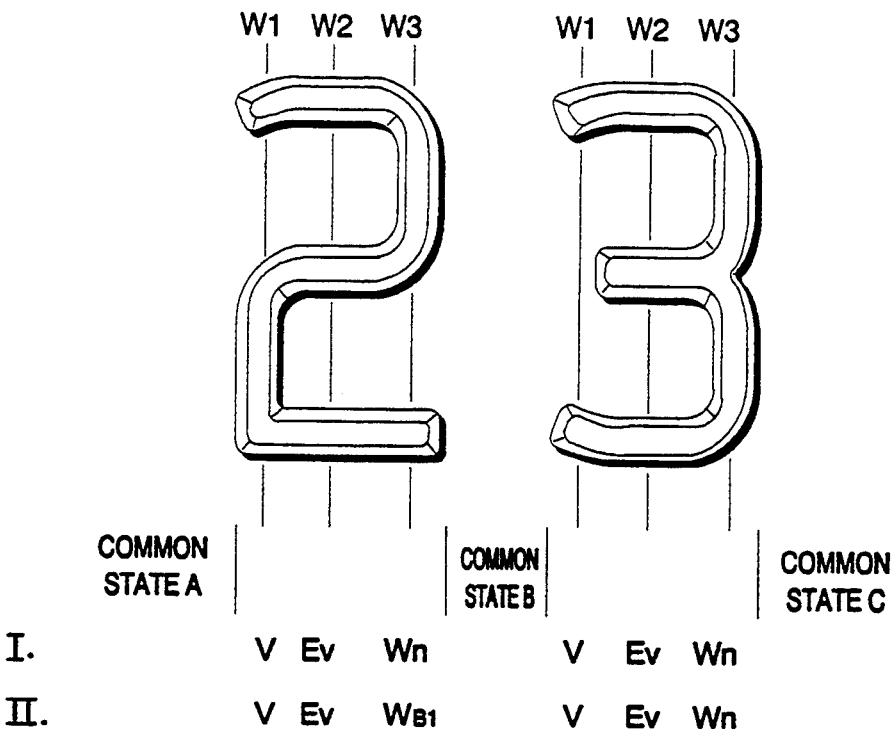
FIGS. 15A-15B are illustrative examples of the relationship between embossed characters and the data windows and regions utilized by the decode algorithm.
Figure 15B:
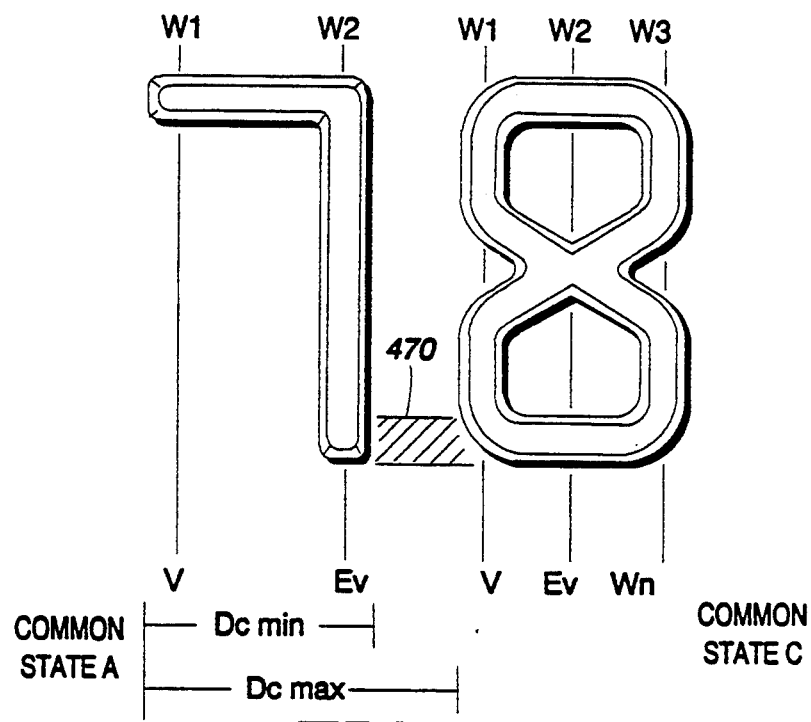

FIGS. 15A–15B provide illustrative background information upon which a detailed discussion of the preferred decode algorithm will be based. FIG. 15A illustrates two characters (the numerals "2" and "3") as they may appear on a card 20. The data windows $W_1$–$W_3$ are indicated above each of the two characters. FIG. 15B illustrates two characters (the numerals "7" and "8") as they may appear on a card 20. The data windows $W_1$–$W_n$ are indicated above each of the two characters. The blank regions between each character, which provide a common state signal, are indicated below the characters. Thus labelled, FIGS. 15A–B provides a basis for describing generally three types of character decode cycles: a normal cycle with no complications; a read cycle in which a valid second sample is not received for a character; and a read cycle in which to consecutive characters appear to be blurred together.

FIG. 15A provides a basis for describing a normal read cycle in which the characters are read and decoded without any complications. This situation is illustrated by the line labelled "I". Prior to encountering the first character ("2"), the data window will be at the common state "A". When data window $W_1$ is detected, this will form a first valid state, indicated by the label "V". When data window $W_2$ is detected, this will provide a second expected value state, indicated by the label "EV". Once the first valid state V and second expected value EV are detected, the character may be uniquely identified. It will be recalled from FIG. 14, that only 8 of the 32 possible combinations of pins P1–P5 can form a first valid state, and that once a particular first valid state has been detected, it must be followed by an expected second value state to properly identify a character.

After first valid state V and second expected value state EV are detected, the method continues sampling data windows $W_n$ until it detects the common state "B". Once the common state "B" is detected, the method is ready to decode the next numeral based on the detection of first valid state V and second expected value EV.

At the line labelled "II", a decode cycle in which a second data window other than second expected value state is detected will be described. Prior to encountering the first character ("2"), the data window will be at the common state "A". When data window $W_1$ is detected, this will form a first valid state, indicated by the label "V". When data window $W_2$ is detected, it may be a non-expected value state, indicated by the label "NEV". Once a first valid state V and non-expected value NEV are detected, the decode algorithm attempts to decode the character backward, and identify the character based on the combination of a valid first forward sample and a valid first backward sample. To accomplish this, the method proceeds from the non-expected value NEV to the common state "B". At that point, the method reads the character backward and detects valid backward data window $W_{B1}$. At this point, the numeral ("2") may be uniquely identified based on these two valid data windows. Once the "2" is identified, the method returns to common state "B" and prepares to detect and decode the next character ("3") in the manner described above in conjunction with the line labelled "I".

FIG. 15B provides a basis for describing a read cycle in which the method is not able to detect the presence of a common state between two characters. This situation arises when a portion of one character or other debris 470 bridges the gap between characters. This situation is illustrated at the line labelled "III". Prior to encountering the first character ("7"), the data window will be at the common state "A". When data window $W_1$ is detected, this will form a first valid state, indicated by the label "V". When data window $W_2$ is detected, this will provide a second expected value state, indicated by the label "EV". Once the first valid state V and second expected value EV are detected, the character may be uniquely identified.

After first valid state V and second expected value state EV are detected, the method continues sampling data windows $W_n$ until it detects to the common state. However, in order to detect cases such as the one illustrated in FIG. 15B, the decode algorithm verifies the position of the sample after each non-common state data sample is detected.

FIG. 15B indicates a range of position for the minimum and maximum distances between the leading edges of two consecutive characters, indicated by $D_{Cmin}$ and $D_{Cmax}$, respectively. These values are provided in the above-referenced ANSI Standard X4.13-1983. After the non-common state sample is detected, the algorithm determines whether the non-00000 sample is located in the range between $D_{Cmin}$ and $D_{Cmax}$. If so, the algorithm undertakes to reposition itself and attempt to decode the following character ("8") although it is not starting from a common state. This repositioning is accomplished by returning to the previous common state "A", and then repositioning the data pointer to a position between $D_{Cmin}$ and $D_{Cmax}$. After this is done, the algorithm proceeds and looks for a first valid state V for the subsequent character ("8"), and attempts to decode the subsequent character in the normal manner described in conjunction with the line labelled "I" of FIG. 15A.

The details of the preferred decode method and variations on the principles described above are provided below in conjunction with the flow diagrams of FIGS. 16, 17, 19, and 20.

Figure 16:
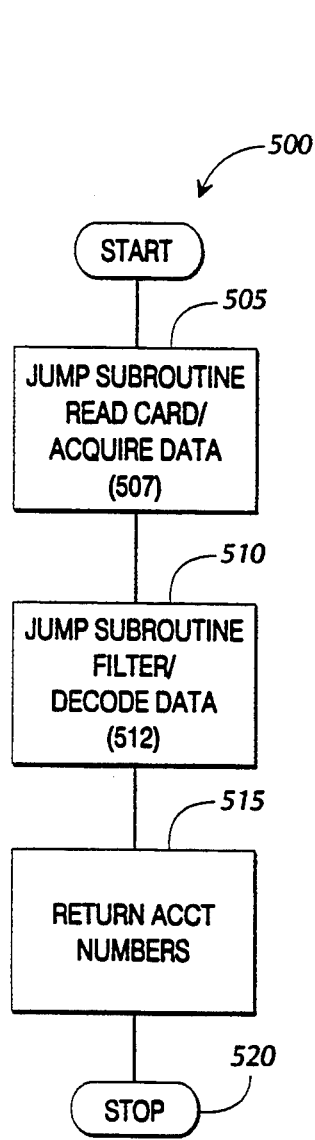
FIG. 16 is a flow diagram illustrating the operation of the main computer program for the control circuit of FIG. 11.

Turning next to FIG. 16, the preferred method 500 will be described by which data representative of embossed characters may decoded. The method 500 also provides a character string corresponding to the decoded data. The preferred embossed character decode method 500 is implemented as software for the microcontroller 451.

At step 505, the method 500 executes subroutine "READ CARD/ACQUIRE DATA" 507. Generally described, the subroutine is operative to detect the presence of the card 15 within card slot 75 and cause the motor 76 to pull the card into the slot. As the card is pulled into the slot and passes beneath the read head assembly 25, the embossed characters are read and a string of data denominated "IN DATA" is stored. After the subroutine 507 determines that the card has been pulled completely into the card slot, the motor is reversed and the card is ejected. As the card moves back toward the opening of the card slot, the embossed characters are read again, and a string of data denominated "OUT DATA" is stored. The subroutine 505 will be described more completely below.

After the embossed character data has been acquired at step 505, the method 500 proceeds to step 510 and calls subroutine "FILTER/DECODE DATA" 512. Generally described, the subroutine 512 initially filters or debounces the data. After the data has been filtered., the subroutine 512 decodes the data in a manner similar to the state diagram illustrated above in conjunction with FIG. 14. The details of the subroutine 512 are provided below.

After the data has been filtered and decoded at step 510, the method 500 proceeds to step 515. At this step, the method provides two account numbers IN ACCT NO and OUT ACCT NO, which correspond to the numbers decoded from IN DATA and OUT DATA. The account numbers are provided to the terminal controller residing in the terminal 55 in which the embossed card reader 10 is located. Ideally, the two account numbers should be identical since they are derived from the same embossed characters 20. However, it is possible that the numbers will be different as a result of defects in the embossed characters 20. In either case, it is contemplated that the terminal controller, which receives the data from the embossed card reader 10, will perform various algorithms useful to determine whether the numbers received from the embossed card reader are valid credit card numbers. These algorithms, such as a MOD 10 check, will be known to those skilled in the art. After the account numbers are provided at step 515, the method terminates at step 520.

Figure 17:
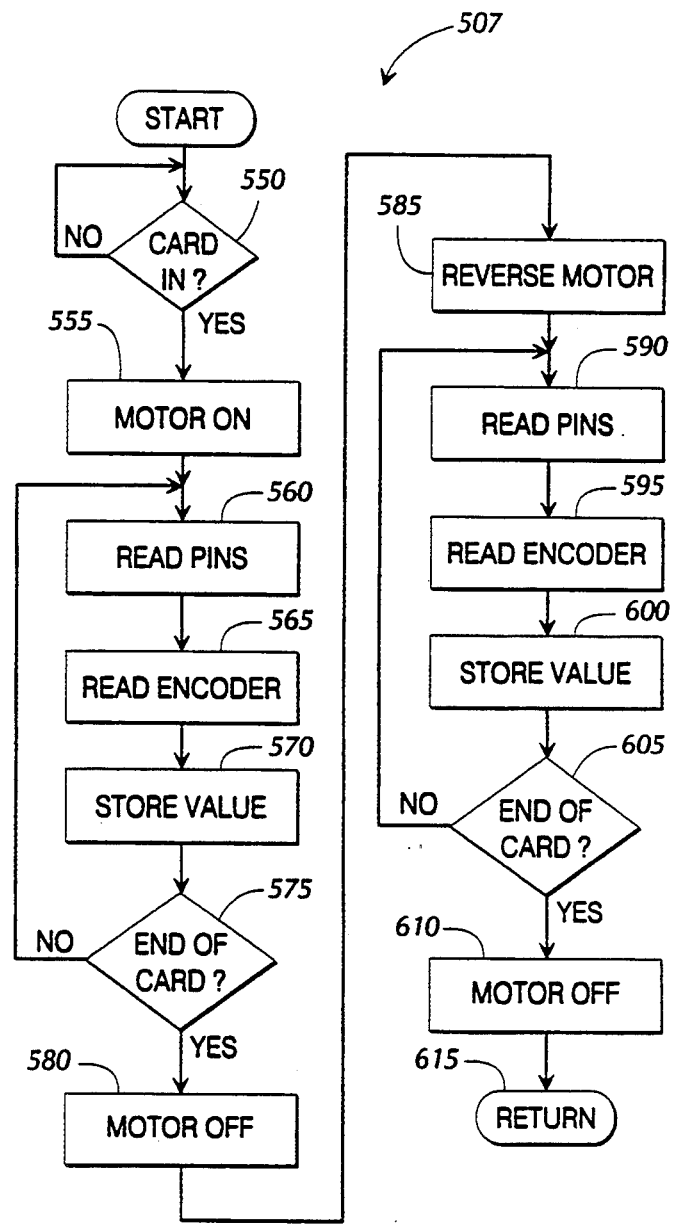
FIG. 17 is a flow diagram illustrating the preferred subroutine READ CARD/ACQUIRE DATA that forms a part of the computer program of FIG. 16.

FIG. 17 illustrates the preferred READ CARD/ACQUIRE DATA subroutine 507. The subroutine begins at step 550 by detecting the insertion of a card 20 into card slot 75. This is accomplished by polling the signal from the optical encoder 100 in order to detect transitions indicating that a card 15 has been inserted into card slot 75. If the optical encoder were constantly polled, it is possible that a false card present signal may be detected if the terminal 55 is bumped and the idler roller 85a rotated as a result. By polling the optical encoder only during subroutine 507, the embossed card reader responds to signals from the encoder only when the insertion of a card is expected. If a card is not detected at step 550, the subroutine returns to step 550 and continues in a loop until a card is detected. Once a card is detected, the subroutine advances to step 555.

At step 555, the motor 76 is actuated in a forward direction by asserting the signal MD1. The motor causes the drive roller 28 to rotate and pull card 20 into card slot 75. The subroutine then proceeds to step 560.

At step 560, the subroutine begins the process of sampling the data from pins P1-P5 30 of the read head assembly 25 in order to provide the IN DATA string from which the embossed characters 20 are decoded. The preferred controller circuit 450 provides a sample clock having a frequency of approximately 10 kHz. During each sample, the subroutine reads the data from the pins P1-P5 and reads the position of the optical encoder 100. These values are stored in RAM 452. Thus, the sampling sequence is illustrated by steps 560, 565, and 570. In order to reduce the amount of data stored in RAM in conjunction with a read cycle, the preferred subroutine 505 does not store consecutive identical values for the pins P1-P5. Instead, the subroutine stores the data from pins P1-P5 and a value indicating the number of times that data value was repeated. Thus, at step 570, the subroutine 505 stores three 8 bit numbers corresponding to the DATA (the value of pins P1-P5), COUNT (the number of identical consecutive samples), and ENCODER (the value of encoder pulses, where each pulse provides resolution of approximately 0.002 inches). The preferred subroutine 507 also maintains a position counter where encoder pulses are accumulated in order to detect the end of the card. Once the DATA, COUNT and ENCODER are stored, the subroutine proceeds to step 575.

At step 575, the subroutine 505 determines whether the end of the card has been reached. This is accomplished by reading the position counter and comparing the total number of encoder pulses received to a predetermined number of pulses indicating that all of the embossed characters 20 have passed beneath the read head assembly 25. Once the predetermined number of encoder pulses has been reached, the subroutine goes to step 580 and stops the motor 78 by cancelling the signal MD1. If, at step 575, the end of the card has not been reached, the subroutine returns to step 560 and continues to sample and store the DATA, COUNT, and ENCODER data that form the IN DATA string until the end of the card is reached.

At step 585, the motor 78 is reversed when the microcontroller 451 asserts the signal MD0. This causes the direction of driver roller 28 to be reversed and the card 20 to be ejected from card slot 75. As the driver roller moves the card back toward the opening of the card slot, the controller circuit 450 samples the pins P1-P5 and forms the data string OUT DATA. This is accomplished by sampling the pins P1-P5 and optical encoder, and storing the data at steps 590, 595, and 600. These steps are identical to steps 560, 565, 570 and 575, which were described above in conjunction with the acquisition of IN DATA.

At step 605, the subroutine determines whether the end of the card has been reached and all of the embossed characters 20 have been read. This is accomplished by reading the position counter and comparing the value to a predetermined number of pulses. If the predetermined number of pulses has been received, the subroutine proceeds to step 610. If not, the subroutine returns to step 590 and continues to sample and store the DATA, COUNT and ENCODER data that constitute the OUT DATA string.

At step 610, the microcontroller 451 cancels signal MD0, thus causing the motor 78 to stop. At this point, the card has been read and the microcontroller 451 quits sampling the signals provided by the pins P1-P5 and the optical encoder 100. At this point, the card 20 is resting in card slot 75 and may be removed by the operator and returned to the cardholder. In the event the removal of the card causes the idler roller 85a to rotate, any signals from the optical encoder will be ignored and will not cause another read cycle will to be initiated.

At step 615, the subroutine 507 is complete and has stored in RAM 452 two strings of raw data representing IN DATA and OUT DATA. Examples of portions of the data string IN DATA are provided below in conjunction with FIG. 18. At this point, the subroutine returns to method 500.

FIG. 18 illustrates a portion of data string OUT DATA 525 collected in accordance with subroutine 507, and provides a basis for discussing generally the decode algorithm employed in the present invention. The raw data forming the string OUT DATA 525 is shown for a card whose first three embossed characters are 1, 2, and 3. In FIG. 18, the pins P1-P5 are shown from right to left. The second column indicates the COUNT data 527, shown as a hexadecimal number. As described above, the COUNT indicates the number of consecutive samples having a particular value. The decimal equivalent of the COUNT data is provided in the column indicated by arrow 530. The fourth column lists the ENCODER data 532, indicating the position on the card of the last data sample having that value. This number is also shown in hexadecimal format, with the decimal equivalent shown at arrow 535.

Generally described, the raw data OUT DATA first is filtered or debounced to remove all samples values having a COUNT value less than a predetermined number. This removes any erroneous data resulting from switch bounce or corrupted characters. In the preferred embossed card reader 10, the predetermined value for a 5-pin read is 32 (20 hex). Thus, during a filtering step, the values indicated by arrow 537 are deleted.

After the OUT DATA is filtered, the preferred algorithm removes any invalid states. Those skilled in the art will understand that a number formed from 5 binary digits may assume any of 32 possible states. However, in decoding characters conforming generally to the characters illustrated in FIG. 13, there are only 13 valid states corresponding the data windows $W_1$-$W_n$. The valid states include 00000, 00001, 00100, 00101, 00111, 10000, 10001, 10100, 10101, 10111, 11100, 11101, and 11111. Thus, the data indicated by arrows 540 will be deleted as invalid states.

It will be apparent to one skilled in the art that the remaining data represents valid data present for more than the predetermined number of samples. This data corresponds to the data windows $W_1$-$W_n$ indicated in FIG. 13. These data windows are provided in FIG. 18 in the column indicated by the arrow 542. From the foregoing discussion, it will be apparent to one skilled in the art that the decoded values indicated by arrow 543 may be decoded from the data provided in FIG. 18.

The ENCODER value is provided to indicate the approximate position of the sample on the card. In the preferred embossed card reader, the stored ENCODER value indicates the last position at which the data value was detected. The leading edge of the card is indicated by an ENCODER value of 00. Thus, the first window $W_1$ of the numeral "1" occurred between ENCODER values of 49 and 62. Since each encoder pulse equals approximately 0.002 inches, it is apparent that the first data window began at a position approximately 0.098 inches from the leading edge of the card 20. Likewise the spacing between samples may be determined by calculating the difference between the ENCODER values for various states. Thus, the common state following the decoded number "1" began at ENCODER value=111, which is 62 encoder pulses, or approximately 0.124 inches from the leading edge of the character.

Figure 19A:
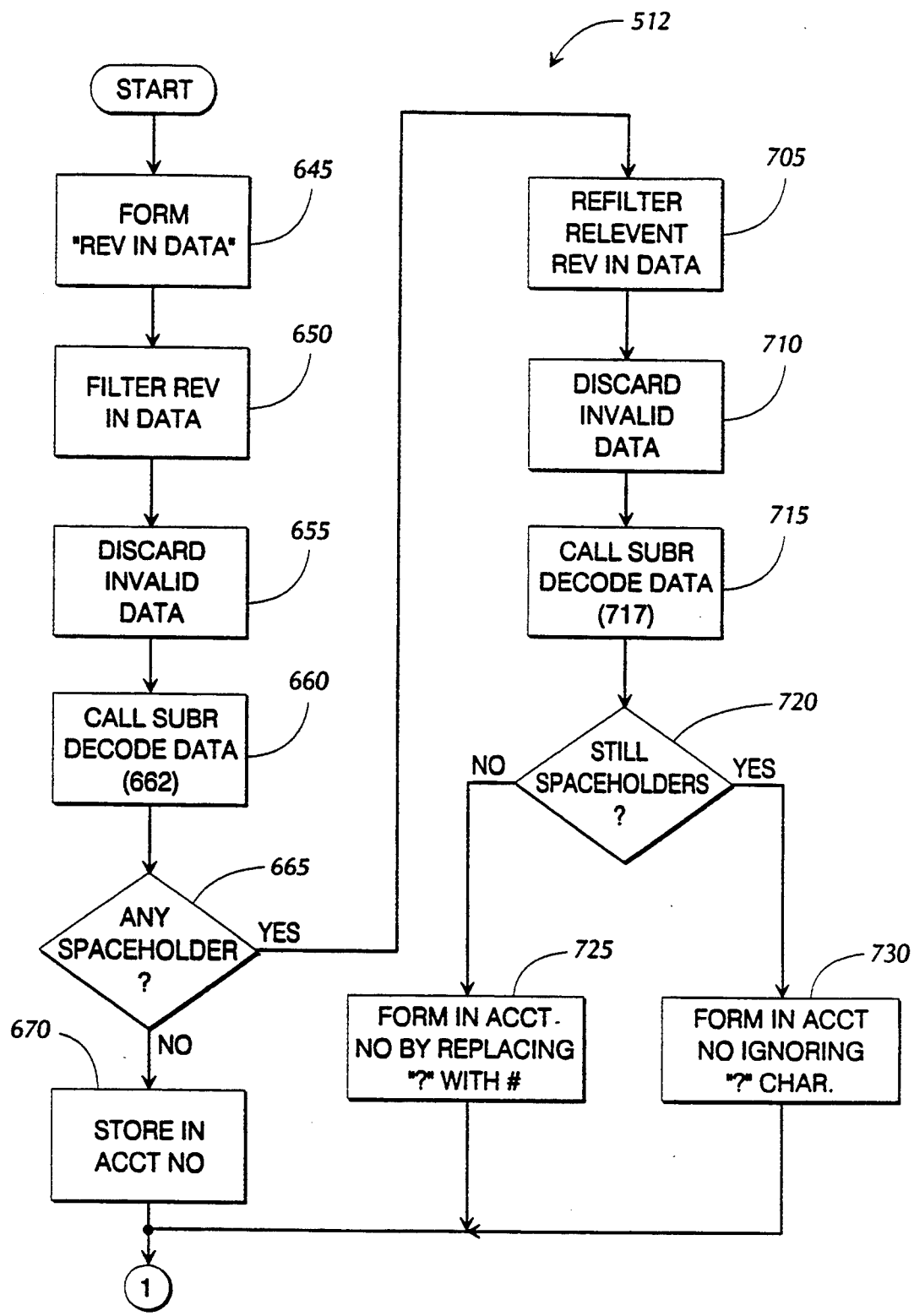
FIGS. 19A-19B provide a flow diagram illustrating the preferred subroutine FILTER/DECODE DATA that forms a part of the computer program of FIG. 16.
Figure 19B:
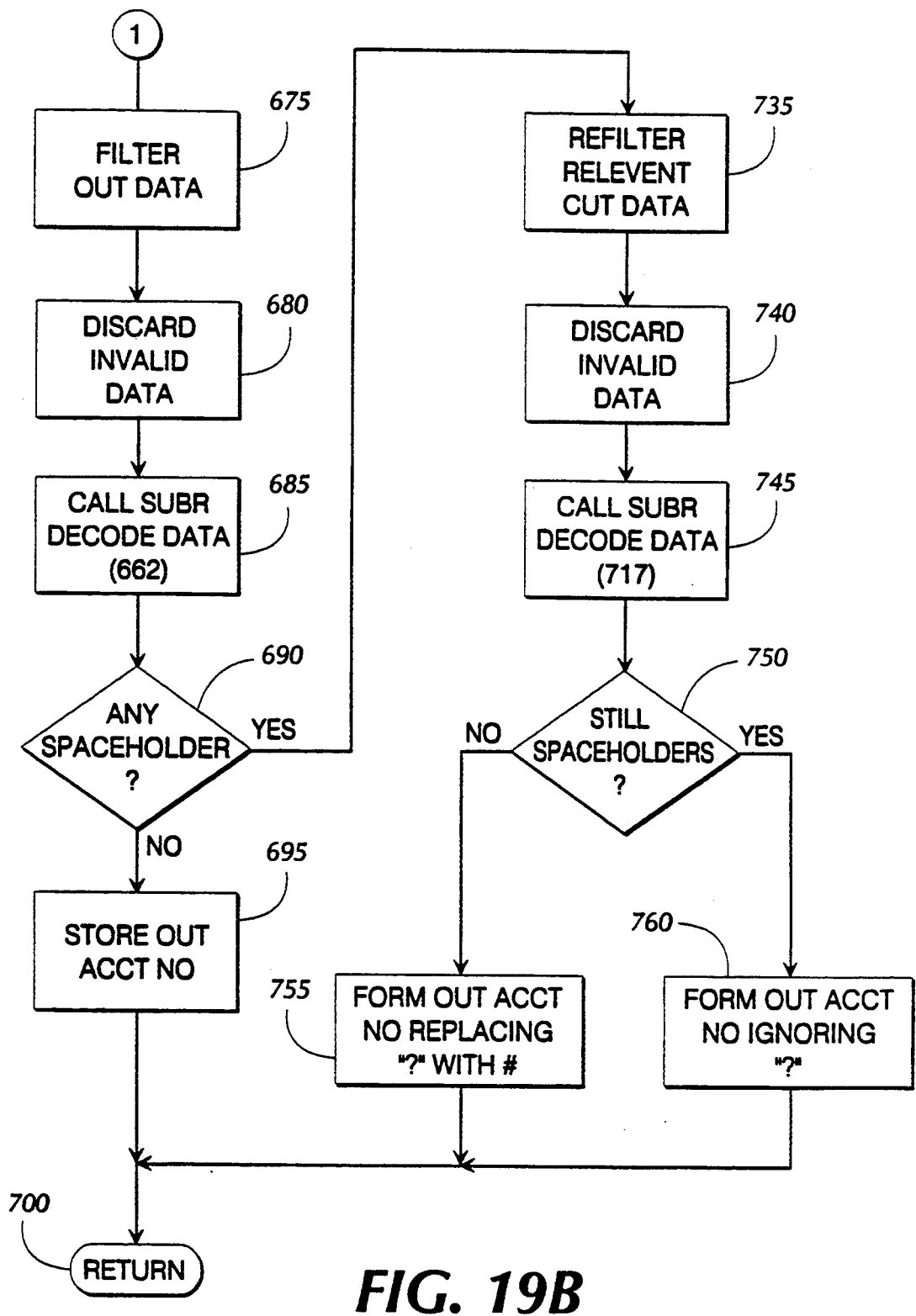
Figure 20A:
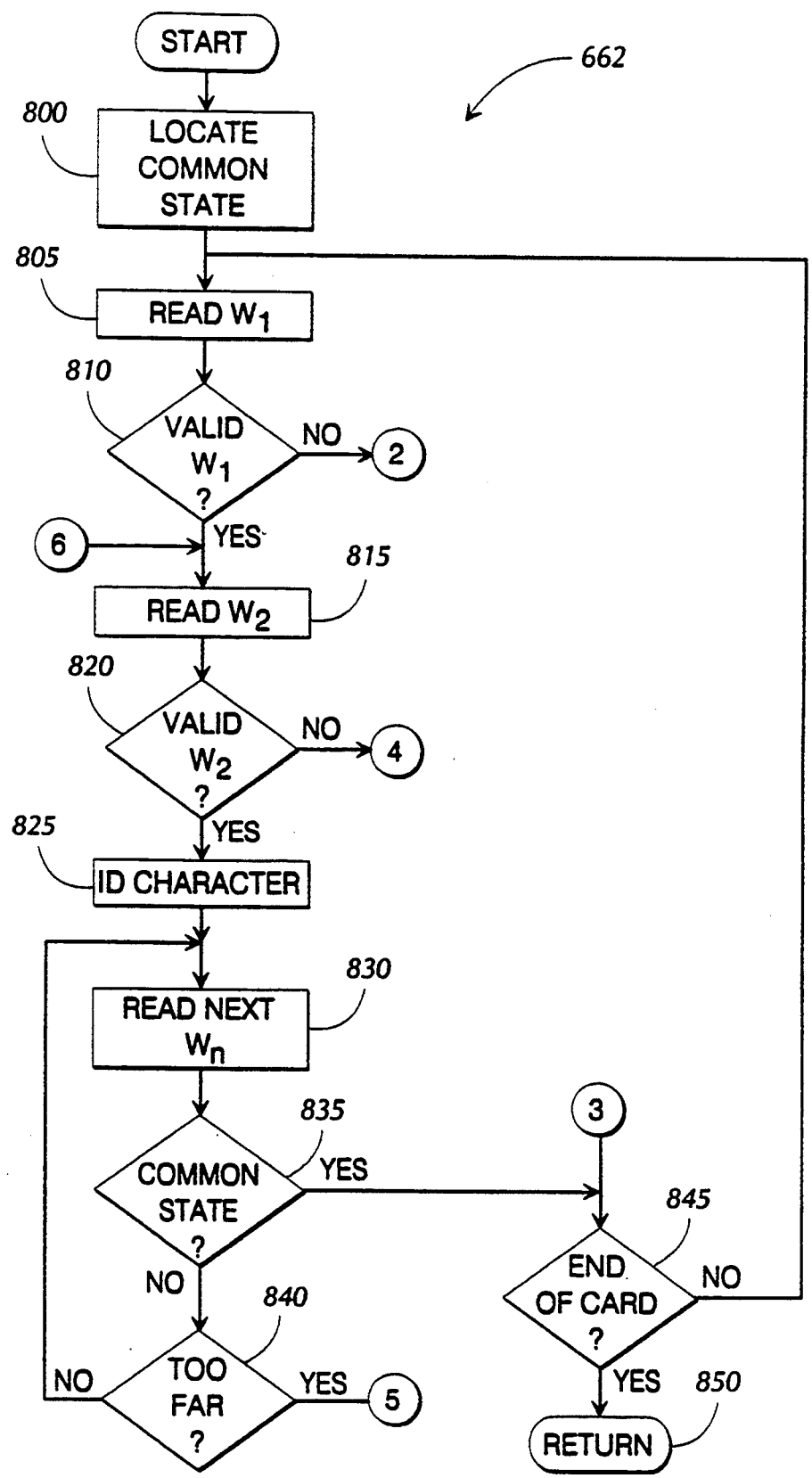
FIGS. 20A-20D provide a flow diagram illustrating the preferred subroutine DECODE DATA that forms a part of the computer program of FIG. 16.
Figure 20B:
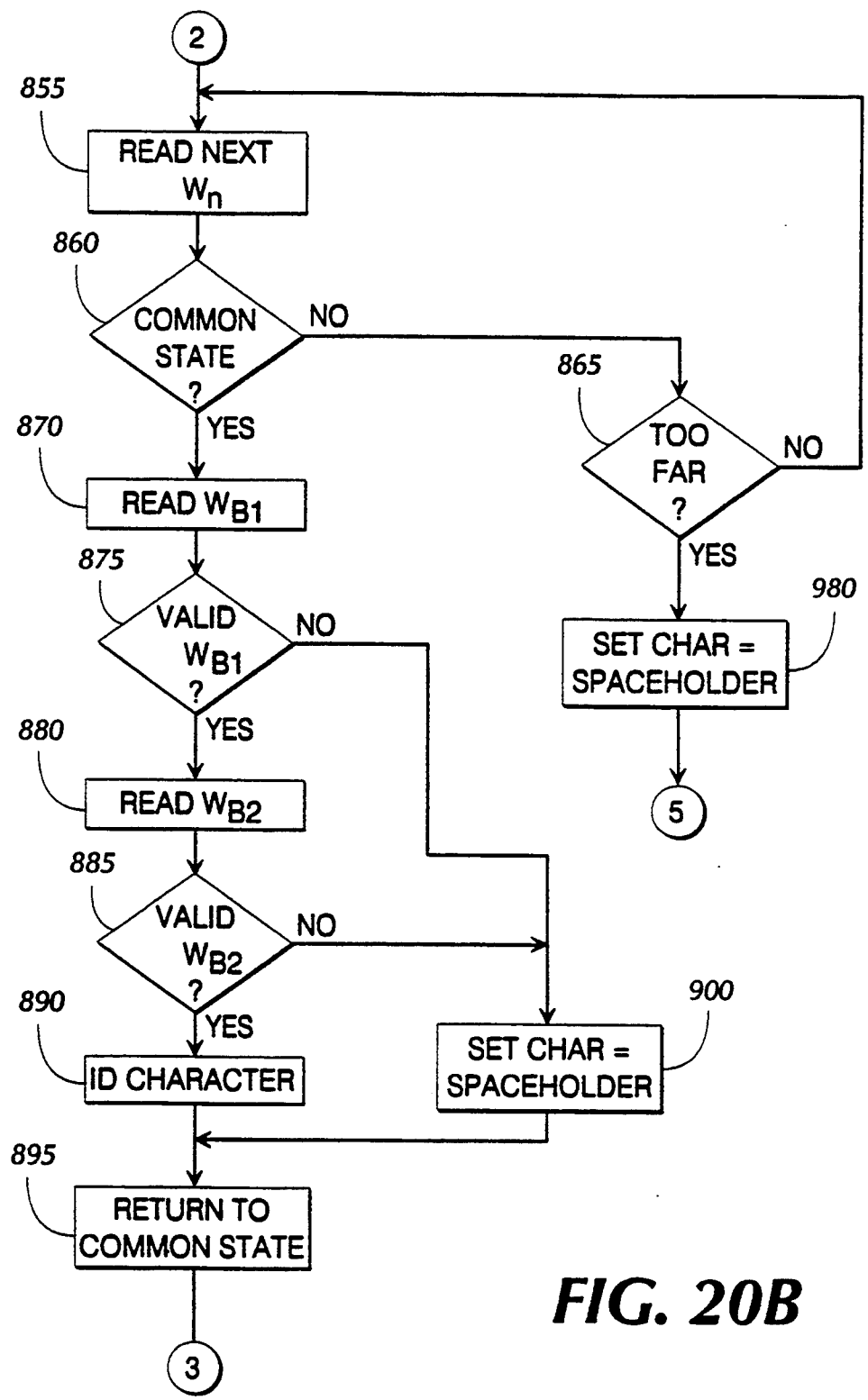
Figure 20C:
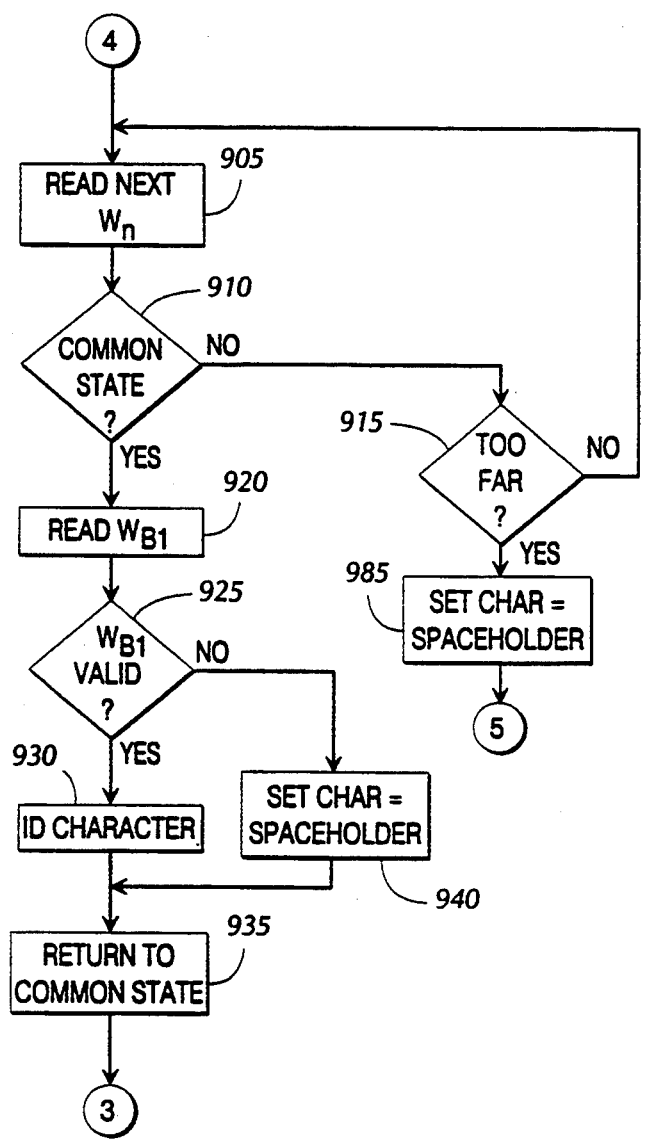
Figure 20D:
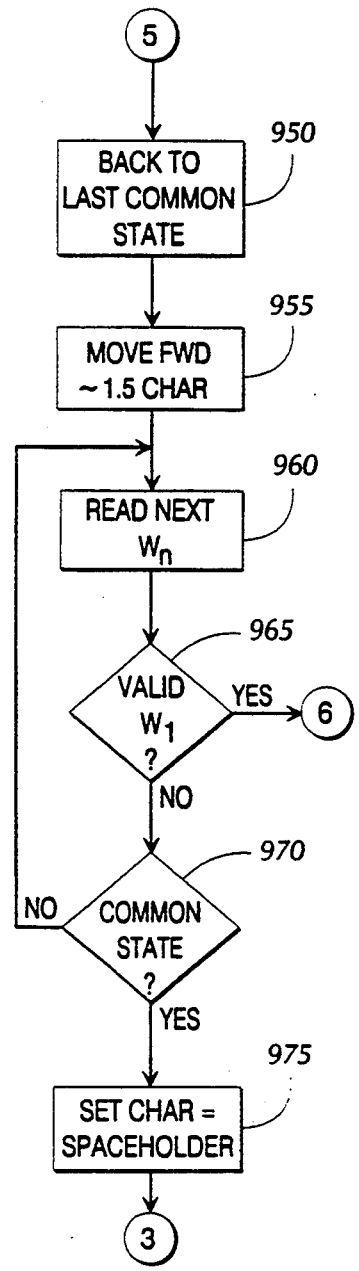

Turning now to FIGS. 19A–19B, the preferred subroutine "FILTER/DECODE DATA" 512 will be described. Generally, the subroutine 512 is operative to filter and decode the data strings IN DATA and OUT DATA. It should be understood that the original data strings are maintained intact, and filtered data strings are created. Initially, the subroutine filters the entire string IN DATA and then decodes the filtered data one character at a time. In the event one or more characters are not properly decoded, the original IN DATA is refiltered according to different criteria and the subroutine attempts to decode the data corresponding to the missing characters using a slightly different algorithm. If the missing characters cannot be decoded, the character is lost and the account number provided by the subroutine will not include the character. After IN DATA is decoded, the subroutine 512 begins to process OUT DATA in the same manner.

The subroutine 512 begins at step 645 by reversing the sequence of IN DATA to provide REV IN DATA. Inasmuch as IN DATA was acquired by reading the embossed characters from right to left, this reversal allows the characters to be decoded from left to right in a manner consistent with the state diagram of FIG. 14. The subroutine then proceeds to step 650.

At step 650, the subroutine filters the string REV IN DATA. The purpose of the filtering step is to effectively debounce any erroneous signals resulting from switch bounce on pins P1–P5 during the sampling at step 560 of method 505. This is accomplished by declaring invalid any data values that were not present for a predetermined number of samples. In the preferred subroutine 512, the predetermined number of samples is 32. Thus, if a data value in the string IN DATA is present for fewer than 32 samples, it is deemed to be erroneous and is deleted from the filtered data string. Once the data string REV IN DATA is filtered, the subroutine 512 proceeds to step 655.

At step 655, the subroutine 512 discards any data values that represent invalid states of the pins P1–P5. Those skilled in the art will understand that data consisting of various combinations of five binary digits may assume any of 32 different states. However, the data windows $W_1$–$W_n$ shown in conjunction with the exemplary characters of FIG. 13 do not represent all of the 32 possible combinations of the pins P1–P5. Thus, it is possible at step 655 to discard data samples representing any of the invalid states.

At step 660, the subroutine 512 calls the subroutine "DECODE DATA" 662. Generally, subroutine 662 is operative to decode the remaining data one character at a time. The subroutine 662 returns numeric values for those characters that were properly decoded and a non-numeric spaceholder for characters that were not decoded. The subroutine 662 is described in more detail below.

Once the decoded data is returned from subroutine 662, the subroutine 512 proceeds to step 665 and tests whether any non-numeric spaceholders were returned. If not, the subroutine proceeds to step 670 and stores IN ACCT NO, which is data representing the account number as derived from the data string IN DATA. From step 670, the subroutine 512 proceeds to step 675 and begins the process of decoding the OUT DATA.

At steps 675, 680, and 685, the subroutine 512 filters the string OUT DATA, discards invalid data, and calls the subroutine DECODE DATA 662 in the same manner described above in conjunction with steps 650, 655, and 660. At step 690, the subroutine 512 determines whether any non-numeric spaceholders were returned. If not, the subroutine proceeds to step 690 and stores OUT ACCT NO, which is data representing the account number as derived from the data string OUT DATA. At step 700, the subroutine 512 returns to method 500.

If, at step 665, the subroutine determines that one or more non-numeric spaceholders were returned from the decode subroutine, the subroutine 512 branches to step 705, and begins the process of refiltering the data in the vicinity of the missing character and attempting to decode the refiltered data. Generally, the vicinity of the missing data is identified using the ENCODER data read from the optical encoder during the execution of the READ CARD/ACQUIRE DATA subroutine 507. Then, the relevant portion of the string REV IN DATA is refiltered so that it may be decoded by using a 3-pin method that relies only on pins P1–P3 (as indicated in FIG. 13). Although a state diagram for a 3-pin decode algorithm is not provided, those skilled in the art will understand that such a state diagram may be easily constructed based on the principles described in conjunction with FIG. 14.

In order to accomplish the 3-pin decode algorithm, the present inventors masks off data corresponding to pins P4 and P5, and decreases the debounce threshold used above in conjunction with step 650. In the preferred step 705, any data value on pins P1–P3 that is present for fewer than 20 clock cycles is filtered out. Those skilled in the art will understand that lowering the debounce threshold effectively lowers the signal to noise ratio of the embossed character data. Once the relevant portion of the data string REV IN DATA is refiltered, the subroutine 512 proceeds to step 710.

At step 710, the subroutine 512 discards any data values that represent invalid states of the pins P1–P3. As described above in conjunction with step 655, those skilled in the art will understand that data consisting of various combinations of three binary values may assume any of 8 different states. However, the data windows $W_1$–$W_n$ shown in conjunction with the exemplary characters of FIG. 13 do not represent all of the 8 possible combinations of the pins P1–P3. Thus, it is possible at step 710 to discard data samples representing any of the invalid states.

At step 715, the subroutine 512 calls the subroutine DECODE DATA 717, which decodes Farrington characters based on data corresponding to pins P1–P3. The subroutine 717 returns numeric values for characters that were properly decoded, and a non-numeric spaceholder for any characters that were not successfully decoded. Inasmuch as the subroutine 717 is operative to decode characters in a manner substantially similar to the method of subroutine 662, one skilled in the art will be able to understand the operation of subroutine 717 by reviewing the detailed description of subroutine 662 provided below. No addition description of the subroutine 717 is provided herein.

Once the decoded data is returned from subroutine 717, the subroutine 512 proceeds to step 720 and tests whether any non-numeric spaceholders were returned. If not, the subroutine proceeds to step 725 and stores IN ACCT NO. The IN ACCT NO data is formed primarily from the data that was properly decoded by at step 660 and has data decoded at step 715 inserted in positions where step 660 returns non-numeric spaceholders. From this point, the subroutine 512 proceeds to step 675 and continues in the manner described above.

If, at step 720, the subroutine 512 determines that non-numeric spaceholders remain, the subroutine 512 proceeds to step 730. At this step, the subroutine 512 deletes the non-numeric spaceholders and forms IN ACCT NO consisting of those characters properly decoded by subroutine 662. When this occurs, the method 500 will return account number data having an improper number of characters at step 515. The present inventors rely on the terminal control software receiving this data to perform various checks to ascertain the validity of the data. From step 730, the subroutine 512 proceeds to step 675 and continues in the manner described above.

Returning now to step 690, if non-numeric spaceholders are returned after the OUT DATA is decoded, the subroutine 512 branches to step 735 and begins the process of refiltering the data in the vicinity of the missing character and attempting to decode the refiltered data. This process is carried out at steps 735, 740, and 745 in same manner described above in conjunction with steps 650, 655, and 660.

Once the decoded data is returned from step 745, the subroutine 512 proceeds to step 750 and tests whether any non-numeric spaceholders were returned. If not, the subroutine proceeds to step 755 and stores OUT ACCT NO. The OUT ACCT NO data is formed primarily from the data that was properly decoded by subroutine 662 and has data decoded at step 715 inserted in positions where step 685 returns non-numeric spaceholders. From this point, the subroutine 512 proceeds to step 700 and returns to the method 500.

If, at step 750, the subroutine 512 determines that non-numeric spaceholders remain, the subroutine 512 proceeds to step 760. At this step, the non-numeric spaceholders are deleted and IN ACCT NO is formed from those characters properly decoded by subroutine 662. When this happens, the method 500 will return account number data having an improper number of characters at step 515. As described above, the present inventors rely on the terminal control software receiving this data to perform various checks to ascertain the validity of the data. From step 760, the subroutine 512 proceeds to step 700 and returns to the method 500.

Turning now to FIGS. 20A–20D, the decode subroutine 662 will be described. Generally, the subroutine 662 is operative to decode the embossed character data from the filtered data strings REV IN DATA and OUT DATA. This is accomplished by decoding the filtered data in a manner that is similar to that illustrated in the state diagram of FIG. 14. The preferred subroutine 662 attempts to decode two valid states associated with each character. If a first valid state and a second expected value state are detected, the subroutine identifies and provides the character associated with those states. If a second expected value state is not detected, the subroutine jumps to the end of the character and attempts to decode the character backwards. If a valid state is found at the end, the subroutine will identify the character based on the combination of the first valid state from the forward read and the first valid state from the backward read. In some cases, the subroutine may not be able to obtain two valid states for a particular character. If the available first valid state uniquely identifies a character, the subroutine will identify the character based on the presence of the unique single valid state. If the single valid state is not unique, the subroutine provides a non-numeric character that functions as a spaceholder until the data is decoded in a second pass.

Although the preferred subroutine 662 decodes a character based on the detection of two valid data states (a first valid state and a second expected value state), the subroutine continues to sample subsequent data windows in order to locate the end of a character and prepare for the detection of subsequent characters. This is accomplished by detecting windows where the signals from pins P1–P5 return to the common state (00000). In some cases, credit cards will be damaged or deformed so that two or more characters are "blurred" together. This prevents pins P1–P5 from returning to the common state between characters. In such cases, the subroutine 662 uses the position data from the optical encoder to determine whether non-00000 data appeared in an area that should be located between characters. If so, the algorithm returns to the beginning of the previous decoded character and then moves forward a predetermined distance that is calculated to place it between that character and the subsequent character. This distance may be determined from the information provided in above-referenced ANSI standard X4.13-1983. Once the pointer has been moved forward, the subroutine reads data windows and looks for a data value corresponding to a first valid state of a character. If a first valid state is not detected, the subroutine goes the end of the character (indicated by the common state) and decodes backward in an attempt to decode the second of the blurred characters. If more than two characters are blurred together, it is possible to decode only the first and last of the blurred characters The details of the decode algorithm are provided below.

The subroutine 662 begins at step 800, where the data window is the common state (00000). From step 800, the subroutine proceeds to step 805 and reads the next data window, $W_1$. At step 810, the subroutine determines whether the data window, $W_1$, contains data that forms a valid state for $W_1$. If so, the subroutine proceeds to step 815.

At step 815, the subroutine reads the next data window, $W_2$. At step 820, the subroutine determines whether data window $W_2$ contains a second expected value that may properly follow the first valid state $W_1$. If data window $W_2$ is valid, the subroutine goes to step 825 and identifies the character.

After the character has been identified at step 825, the subroutine proceeds to step 830, where it begins searching for the end of the decoded character. This is accomplished by reading the next data window $W_n$. At step 835, the subroutine determines whether the data window $W_n$ contains 00000. If not, the end of the character has not been reached, and the subroutine 662 proceeds to step 840. At this step, the subroutine attempts to detect cases where two characters have been blurred together. This is accomplished by using the position data from the optical encoder to determine whether non-00000 data appeared in an area that should be located between characters. If not, the subroutine loops back to step 830. If, at step 835, the subroutine determines that the data window is 00000, the subroutine proceeds to step 845 and determines whether the end of the card 20 has been reached. This is achieved by counting the pulses received from the optical encoder 100. If the current position indicates that the pointer is not yet at the end of the card, the subroutine loops backs to step 805 and continues to decode embossed character data. If the end of the card has been reached, the subroutine proceeds to step 850 where it returns to the subroutine 512 and provides the decoded account data.

The process described above in conjunction with steps 800 through 850 is operative to decode filtered embossed character data where the data closely corresponds to data that would be expected from perfectly formed characters. This portion of the subroutine 662 is able to decode embossed characters on approximately 95% of credit cards that are in use by cardholders (i.e., not brand new cards). In order to accurately decode the remaining cards, it is necessary to provide branches that respond to invalid first or second data windows, and to characters that appear to be blurred together. These portions of the subroutine 662 will be discussed at this juncture.

If at step 810, the subroutine determines that data acquired for data window $W_1$ is invalid, the subroutine goes to the end of the character and attempts to decode the character backwards. To accomplish this, the subroutine branches to step 855, where the next data window $W_n$ is read. At step 860, the subroutine determines whether the window $W_n$ is 00000, which would indicate that the end of the character has been reached. If not, the subroutine proceeds to step 865. At this step, the subroutine attempts to detect cases where two characters have been blurred together by testing to see if the location of the current window places it between two characters. If not, the subroutine loops back to step 855.

If, at step 860, the window $W_n$ is 00000, the subroutine proceeds to step 870 and attempts to decode the character backward. At step 870, the subroutine reads backward window $W_{B1}$. At step 875, the validity of window $W_{B1}$ is determined. If the data window is a valid state for the first window of a backward read, the subroutine goes to step 880 and reads backward data window $W_{B2}$. From step 880, the subroutine proceeds to step 885, where it determines whether the data window $W_{B2}$ is a valid second expected value with respect to data window $W_{B1}$. If so, the subroutine proceeds to step 890 and identifies the character based on the two valid data windows $W_{B1}$ and $W_{B2}$. Once the character is identified, which subroutine goes to step 895 where it returns the pointer to the common state at which it began the backward read cycle. From here, the subroutine branches to step 845, where it tests for the end of the card and continues as described above.

Returning now to step 875, if the data window $W_{B1}$ is invalid, the subroutine is unable to identify the character and goes to step 900. At step 900, the subroutine identifies the character with a non-numeric spaceholder described above in conjunction with subroutine 512. From step 900, the subroutine proceeds to step 895 and continues in the manner described above.

Returning now to step 885, if the data window $W_{B2}$ is invalid, the subroutine is unable to identify the character and goes to step 900, where it identifies the character with a non-numeric spaceholder. From step 900, the subroutine proceeds as described above.

Returning now to step 820, the response to the detection of an invalid data window $W_2$ will be described. If at step 820, the subroutine determines that data acquired for data window $W_2$ is not a second expected value, and is, therefore, invalid, the subroutine goes to the end of the character and tries to read it backwards. The subroutine branches to step 905, where the next data window $W_n$ is read. At step 910, the subroutine determines whether the window $W_n$ is 00000, which would indicate that the end of the character has been reached. If not, the subroutine proceeds to step 915. At this step, the subroutine attempts to detect cases where two characters have been blurred together by testing to see if the location of the current data window places it between two characters. If not, the subroutine loops back to step 905.

If, at step 910, the window $W_n$ is 00000, the subroutine proceeds to step 920 and tries to decode the character backward. At step 920, the subroutine reads backward window $W_{B1}$. At step 925, the subroutine determines whether the data window $W_{B1}$ is valid with respect to valid forward data window $W_1$. If so, the subroutine proceeds to step 930 and identifies the character based on the two valid data windows $W_1$ and $W_{B1}$. Once the character is identified, which subroutine goes to step 935, where it returns to the common state at which it began the backward read cycle. From there, the subroutine branches to step 845, where it tests for the end of the card and continues in the manner described above.

Returning now to step 925, if the data window WB1 is invalid with respect to forward data window $W_1$, the subroutine is unable to identify the character and proceeds to step 940. At step 940, the subroutine identifies the character with a non-numeric spaceholder. From step 940, the subroutine proceeds to step 935 and continues in the manner described above.

As mentioned briefly above, the preferred subroutine 662 is operative to decode two characters that have been blurred together. Generally, this is accomplished by using the position data provided by the encoder pulses to determine when the pointer is positioned between two characters even though the data from pins P1–P5 has not returned to the common state (00000). When this condition is detected, the pointer is returned to the beginning of the preceding character, and is then moved ahead a distance that should place the pointer between the two blurred characters. Once the pointer is repositioned, it continues to sample data and look for a first valid data window $W_1$, even though it is not starting from the common state. The routine that performs this may be entered from any of three entry points in the subroutine 662. Each of these will be described below.

If at step 840, the subroutine determines that the pointer has moved too far without detecting a data window of 00000, the subroutine branches to step 950.

At step 950, the pointer is returned to the beginning of the last character (i.e., the last position where data window=00000). From step 950, the subroutine goes to step 955.

At step 955, the subroutine determines the position of the pointer and increments it by a number that should position the pointer between the current character and the subsequent character. Those skilled in the art will appreciate that the spacing of characters on a card is controlled by ANSI Standard X4.13-1983. After the pointer is incremented, the subroutine proceeds to step 960.

At step 960, the subroutine begins reading data windows and looking for valid combinations for data window $W_1$ of the next character. At step 965, the subroutine determines whether the value of data window $W_n$ read at step 960 constitutes a valid data window $W_1$ for any numeric character. If it does, the subroutine returns to step 815 and continues to decode data in the manner described above.

If, at step 965, the data window does not form a first valid data window $W_1$, the subroutine goes to step 970 and determines whether the data window $W_1$ is 00000. If not, the subroutine returns to step 960 and continues as described above. If, at step 970, the value of data window $W_n$ is 00000, the subroutine determines that the a character has been missed and proceeds to step 975. At step 975, the subroutine returns a non-numeric spaceholder. From step 975, the subroutine returns to step 845 and continues in the manner described above.

The subroutine 662 may also arrive at step 950 from either of steps 865 or 915. If, at step 865, the subroutine finds that the pointer has advanced past the end of the character without detecting a data window=00000, it determines that a character has been missed and provides a non-numeric spaceholding character at step 980. From step 980, the subroutine proceeds to step 950 and looks for the next character in the manner described above. This same process is implemented at steps 915 and 985, as illustrated in the flow diagram of FIGS. 20A-20D.

From the foregoing, it will be apparent that the principles of operation of the present invention may be applied to decode embossed character data based on various combinations of data from pins P1-P5, other than the particular 5-pin and 3-pin methods described in detail above. Therefore, those skilled in the art will be enabled to implement the present invention for various fonts, alphabets, degrees of sensitivity, and robustness.

Floating Read Head

FIG. 21 is an exploded view of a floating read head subassembly 25' constructed in accordance with an alternative embodiment of the present invention. In this embodiment, the entire read head subassembly floats relative to the surface of an embossed card, and thereby references the pins to the embossing for more accurate reading. The floating read head gently engages the edge of the card, lifts itself upon the surface of the card, and rides atop the card, thereby minimizing the pin travel and reducing the tendency of the pins to catch or grab the edge of a card or sharp, elevated embossed characters on a new card.

With the exception of the floating read head support block 26' and the pins 30', the floating read head subassembly 25' is identical to the read head subassembly 25 described in conjunction with FIG. 4. Unlike the support block 26, which includes downwardly extending portions 230 that rest on the top surface of the card (FIG. 4), the floating read head support block 26' (FIG. 21) is designed to provide a planar character contact surface 1000 that is juxtaposed opposite the planar surface of a card and rest directly on the top of the embossed characters as the card passes beneath the read head subassembly 25'. The pins 30' differ from pins 30 only in that the pins 30' are slightly shorter, since the pin travel is reduced.

The floating read head subassembly 25' includes a floating read head housing or support block 26', read head pins 30', a printed circuit board 310, a conductive leaf spring 315, and a clamp 320. The pins 30' are generally of a cylindrical shape. The bottom end of each pin is rounded at the tip 33'. The upper end of the pin forms a support portion 34', which has a slightly larger diameter than the lower portion of the pins 30'.

As best seen in FIG. 22, the floating head support block 26' includes five cylindrical bores 325'. Like the bores 325 in support block 26 (FIG. 4), the bores 325' have a uniform diameter slightly smaller than the support portions 34' of the pins 30'. Thus, the pins 30' are supported at the top of the bores 325'. The narrower portions of the pins 30' extend through and are slidably housed within the bores 325'.

Like the read head subassembly 25, the floating read head subassembly 25' comprises a printed circuit (PC) board 310 including a pin cavity 335 through which pins 30' extend. When the printed circuit board 310 is mounted on the support block 26', the pin cavity 335 is positioned adjacent the bores 325' so that the support portion 34' of the pins extends through the cavity. Printed circuit board 310 includes a ground pad 340 and five signal pads 345, one for each pin. Wires (not shown) are soldered to pads at one end of the board and carry signals indicative of the state of a pin—raised when in contact with embossing, lowered when not in contact. Traces on the printed circuit board 310 connect each of the signal pads 345 and the ground pad 340 to one of the wires.

The floating read head subassembly 25' is operative to float along the top surface of the embossed characters as the card moves in relation to the read head subassembly. By operating in this manner, the floating read head subassembly 25' is capable of reading and accurately decoding the embossed characters on a card regardless of whether the characters are worn down from use, or new and still have relatively tall (elevated) vertical edges.

Stated in other words, the floating read head subassembly 25' of FIG. 22 is operative to move relative to the surface of a card and the embossing on the card, thereby allowing the pins in the read head to move referenced and relative to the embossing on the surface. With the read head itself referenced to the embossing, the pins need not travel as far vertically as in the earlier-described embodiment, since some portion of the travel distance of the pins is absorbed by the movement of the entire read head subassembly relative to the surface of the card and the embossing. This contrasts with the embodiment of FIG. 4, where the pins are referenced to the support block 26 and move relative to the support block, and the support block is relatively immobile.

Figure 25:
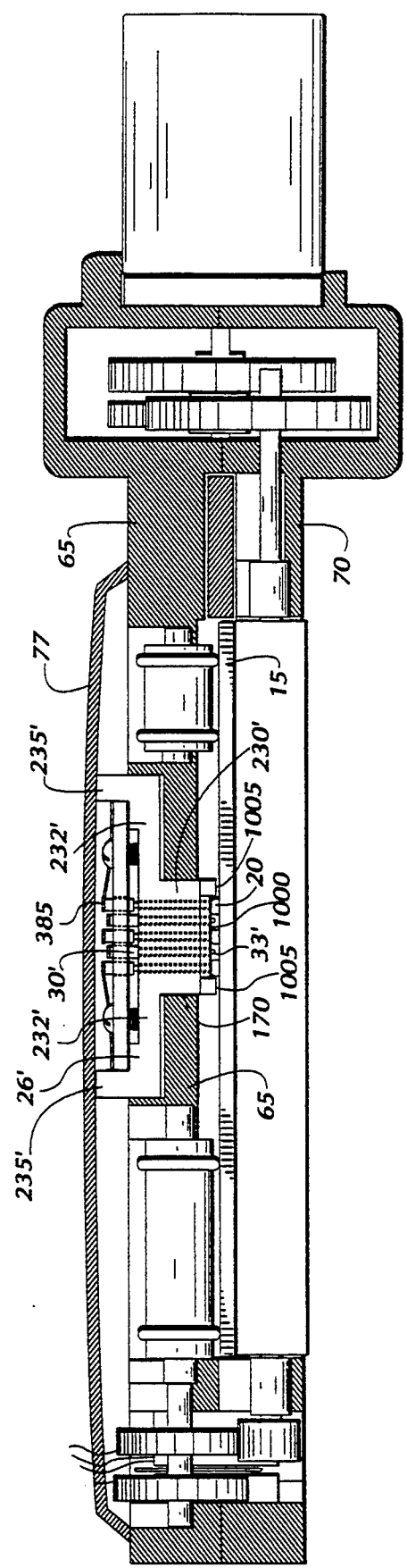
FIG. 25 is a cross-sectional view of the embossed card reader taken along the line 10—10 of FIG. 2, with the preferred floating read head subassembly of FIG. 21 substituted for the read head assembly of FIG. 4.

As illustrated in FIG. 22 and FIG. 25, the floating head support block 26' comprises a downwardly extending read head portion 230' that extends into the void or cavity 170 formed between the upper housing portion 65 and lower housing portion 70. Extending outwardly from the read head portion 230' are a pair of support wings 232' that are supported by an interior surface 1028 of the top housing portion 65 when the floating read head subassembly 25' is fully inserted into the cavity. At the outermost periphery of the support block 26' are upwardly extending cover support rails 235' that engage with the cover 77. The preferred plastic cover 77, when fastened in place, biases the floating read subassembly 25' downward while providing a spring-like action that allows the read head to be pushed up slightly as a card travels beneath the read head. In this manner, the cover retains the support block 26' in operative position for reading the embossing.

Still referring to FIG. 22, a pair of support shelves 237' for supporting a printed circuit board are formed in the support block 26', positioned immediately inwardly of the cover support rails 235' and extending upwardly from the support wings 232'. As seen in FIG. 21, the printed circuit board 310 includes mounting holes 355 and adjusting holes 360. The adjusting holes 360 are aligned with threaded holes 330' provided in the upper surface of the support block 26' and allow access to height adjusting screws 336. The diameter of the adjusting holes 360 is slightly smaller than the heads of the adjusting screws 336. The printed circuit board 310 rests on the heads of the screws 336. Adjusting holes 360 allow a small screwdriver or allen wrench to be extended through the holes to adjust screws 336. By adjusting the height of the PC board 310 relative to the support block 26', and thus to the top of the pins 30', the travel distance for the pins 30' to the point of contact with the fingers 40 can be adjusted, to compensate for minor variations in the thickness of the support block 26', the PC board 310, and the length of the pins 30'.

Like the read head subassembly 25, the floating read head subassembly 25' includes a conductive leaf spring 315, having fingers 40 that contact with the tops of the pins 30' extending through the cavity 335 in the PC board 310. The operation of the pins, leaf spring, fingers, etc. is the same as above in connection with other embodiments and will not be repeated.

As shown in FIG. 25, when a pin 30' is not contacting with an embossing on card 15, the rounded endpoint or tip 33' of the pin is biased downward by the finger 40 of the leaf spring 315. When the embossing 20 is encountered, the pin 30' is lifted up, against the bias of the leaf spring finger, lifting the endpoint 385 off of the signal trace 345 on the PC board 310, breaking the electrical contact.

FIGS. 22 and 23 illustrate the floating read head support block 26' and the features that allow it to float along the top of the embossed characters. The support block 26' includes a character contact surface 1000, which rests atop the embossed character as the characters are being read. The contact surface 1000 is generally a flat, planar surface that is juxtaposed parallel to the plane of a card as the card is moved past the pins during a read operation. Preferably, the character contact surface 1000 is disposed in a horizontal orientation, and the card is transported in a horizontal orientation.

The pins 30' extend vertically through the support block 26' so that the tips 33' extend just below the character contact surface 1000, where they are able to contact the embossed characters. The pins 30' preferably extend approximately 0.008 inches below the horizontal character contact surface 1000 when under bias from the spring 315 (not shown in FIG. 22).

As seen in FIG. 22, downwardly extending, rail-like card engaging guide rails 1005 with tapered leading and trailing surfaces are provided at the sides of the read head portion 230', for engaging with a card and with the tops and bottoms of embossed characters. The guide rails also guide the body of the character under the pins for reading. The character guide rails 1005 preferably extend approximately 0.010 inches below the horizontal character contact surface 1000 and define a channel through which the embossed characters are guided. This channel is similar to the channel defined by the downwardly extending read head portion 230 of read head support block 26. (See FIG. 10).

As seen in FIG. 24, an inclined leading character contact surface 1006 and an inclined trailing character contact surface 1010 are provided on opposite ends of the character contact surface 1000. These angled surfaces allow the read head support block 26' to gradually engage and disengage the embossing on a card as the card travels beneath the read head.

Angled or inclined guide rail leading and trailing surfaces 1020, 1025 also are provided at the beginning and end of the guide rails 1005. The guide rail leading surface 1020 engages with the card at the beginning of the read operation and operates to impart a lifting force to the read head subassembly, thereby lifting the read head subassembly onto the surface of the card. The inclined character guide leading surface 1020 thereby provides for gradual and gentle initial engagement with the card and minimizes the likelihood of "grabbing" or catching an edge of the card.

The action of the guide rails 1005 also minimizes the likelihood of grabbing or catching on the card embossing, which is most likely to occur with new cards having sharp, elevated embossing. The guide rails 1005 thereby minimize premature pin actuation, since the guide rails extend slightly below and shield the endpoints of the pins 30'. The guide rails 1005 first contact with the edge of a card and protect the pins from actuation by lifting the entire read head subassembly. The guide rails then ride atop the surface of the card until the embossing is encountered, when the leading character contact surface 1006 engages with the embossing and lifts the read head subassembly even further.

FIG. 25 is a cross-sectional view of the embossed card reader illustrating the operation of the preferred floating read head subassembly 25'. FIG. 25 illustrates the relation between the pins 30', floating read head support block 26', and embossed characters 20 as the card 15 passes beneath the read head assembly. As described earlier, the horizontal character contact surface 1000 rides atop of the embossed character 20. The guide rails 1005 are parallel rails positioned at the outer edges of the contact surface 1000. The guide rails 1005 form a channel for ensuring that the embossed characters 20 are properly aligned beneath the read head support block 26'. When the read head is atop the embossed characters 20, the guide rails 1005 do not come into contact with the top surface of the credit card 15.

As described above, the length of pins 30' is preferably long enough such that the tips 33' of pins 30' extend just below the character contact surface 1000 when the pin is not in contact with an embossed character 20, but not beyond the bottommost extent of the guide rails 1005. When the pin contacts a segment of the embossed character, the pin 30' is raised so that it pushes the endpoint 385 of the corresponding leaf spring finger 40 upward, thus breaking the electrical contact between the leaf spring finger and the signal trace 345. The operation of the switch is described in more detail above in conjunction with FIGS. 6A–6B.

FIGS. 26A–26D are partial cross-sectional views showing the operation of the preferred floating read head subassembly 25' during four phases of a typical embossed character read cycle. FIGS. 26A–26D illustrate the relationship between the read head support block 26', pins 30', leaf spring fingers 40, signals traces or pads 345, and cover plate 77, as the floating read head subassembly 25' encounters the embossed characters 20 on the credit card 15.

FIG. 26A illustrates the operation of the read head subassembly 25' as the card 15 first encounters the read head support block 26'. Prior to the initial contact, the read head support block 26' is fully seated in the downward direction and supported by support wings 232', positioned in the cavity 170 of the housing top portion 65. It will be understood that in this normal, rest position, the support wings 232' are in contact with and resting atop the interior surface 1028 of the housing top portion 65. Also, the subassembly 25' is biased downwardly by the resilience of the top 77.

As the embossed card 15 travels in the direction of arrow 1030, the leading edge of the card first comes into contact with the guide rail leading surfaces 1020, which begin to force the read head subassembly 25' to move upwardly. At this point, the pins 30' are extending downward as far as possible. In this position, the tips 33' of pins 30' extend below the horizontal character contact surface 1000, but not below the guide rails 1005. In this beginning stage of the operation, the leaf spring fingers 40 are in contact with the signal traces 345 so that the switch formed by the leaf spring and circuit board is closed.

As shown in FIG. 26B, the continued movement of the card 15 in the direction of arrow 1030 results in the top surface of the card 15 coming into contact with, and moving beneath, the guide rails 1005. This causes the read head subassembly 25' to move further in the upward direction. It will be seen that the support wings 232' begin to separate from supporting contact with the interior surface 1028 of the housing top portion 65. The pins 30' are shielded from premature actuation by the guide rails 1005 and have not yet contacted with any embossing, so at this point, the switch formed by the leaf spring and circuit board remains closed.

In FIG. 26C, the credit card 15 has moved further in the direction of arrow 1030. This results in the first of the embossed characters 20 coming into contact with, first, the character contact leading surface 1006, and second, the character contact surface 1000, and thereby forcing the read head subassembly 25' further in the upward direction, so that the character contact surface 1000 rides or floats along the top of the embossed characters 20 as the card 15 continues to move in the direction of arrow 1030.

Note in FIG. 26C that the guide rails 1005 are now lifted off the surface of the card, as the character contact surface 1000 now rides atop the embossing on the card. At this point, the top portion of the read head support block 26' is forced upward against the plastic cover plate 77. As described above, the cover plate 77 is flexible and biases the read head subassembly 25' downward against the embossed characters 20. Inasmuch as the embossed characters still have not come into contact with the pins 30', the pins 30' remain extended down as far as possible and the leaf spring fingers 40 remain in contact with the printed circuit board 310.

In FIG. 26D, the continued movement of the card 15 in the direction of arrow 1030 has resulted in the first embossed character 20 coming into contact with the pins 30'. This causes the pin 30' to move upwardly so that the tip of the corresponding leaf spring finger 40 is lifted off the corresponding signal trace 345 on the PC board 310, thus causing the electrical switch formed by the leaf spring and circuit board to be open. As described above, the electrical signals produced by the opening and closing of the switches are provided to the microcontroller 451, where they are decoded.

Those skilled in the art will appreciate that as the card 15 continues to move in the direction of the arrow 1030, each of the characters 20 embossed on card 15 will travel beneath the pins 30' and cause the pins and leaf spring fingers to operate in a similar manner. These electrical signals are decoded in the manner described above to provide numeric data corresponding the characters embossed on the card 15. Once the card travels in the direction of arrow 1030 to the end of the card travel path, the direction of the card is reversed. As the card travels back in the opposite direction, the embossed characters may be read in the same manner.

From the foregoing description, it will be understood that the floating embossed character read head is operative for providing, first, relative movement of the entire read head subassembly with respect to a card as the card is engaged, and, second, relative movement of the pins of the read head subassembly with respect to embossing on the card. This allows for "referencing" of the pins to the surface of the card (more particularly, to the embossing itself), thereby providing more accurate reading of embossing that is worn, where the elevation of the embossing relative to the surface of an older, worn card is less than the elevation of the embossing of a newer, less worn card. In this manner, compensation is provided for variations in the elevation of the card's embossing relative to the surface of the card. Accordingly, the floating read head of the present invention is capable of more accurately detecting the embossed characters on a card regardless of whether the card is new or worn. The floating read head includes a relatively small number of parts and may be manufactured simply and inexpensively.

It will now be appreciated that a floating read head constructed according to the present invention provides a read head support block having a character contact or reference surface operative for moving or floating along the top surface of the embossed characters. By providing a plurality of pins that extend just below this reference surface, but shielded from premature actuation, the floating read head is able to read new and worn embossed characters while avoiding the difficulties found in prior embossed card readers.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. An embossed card reader for reading characters embossed on a surface of a card, comprising:

a floating read head support including a character contact surface and defining a plurality of passageways perpendicular to said character contact surface, said character contact surface being operative for moving along a surface defined by said characters;

a plurality of pins extending through said passageways and positioned to contact said characters; and a plurality of electrical contact switches, each of said plurality of switches operatively associated with one of said plurality of pins, said electrical contact switches being operative for making electrical circuits responsive to the movement of said pins in contact with said characters on said card.

2. An embossed card reader as recited in claim 1, wherein said electrical contact switches comprise electrically conductive fingers, and wherein said fingers are mounted over said pins in a cantilever arrangement, whereby said fingers are deformed in response to the movement of said pins in contact with said characters.

3. An embossed card reader as recited in claim 1, further comprising a biasing mechanism for biasing said contact surface against said embossed characters.

4. An embossed card reader as recited in claim 3, wherein said biasing mechanism comprises a plastic cover positioned above said read head.

5. An embossed card reader as recited in claim 1, wherein said floating read head support further comprises a card engaging guide; and wherein each of said plurality of pins extend into a region defined at by said horizontal character contact surface and by said card engaging guide.

6. An embossed card reader as recited in claim 5, wherein said card engaging guide comprises two parallel guide rails extending from the edges of said character contact surface.

7. An embossed card reader as recited in claim 6, further comprising an inclined guide rail leading surface adjacent said guide rails, said inclined guide rail leading surface operative for allowing said card engaging guide to engage said card.

8. An embossed card reader as recited in claim 6, wherein said card engaging guide is operative for lifting said floating read head onto the surface of the card.

9. An embossed card reader as recited in claim 1, further comprising an inclined character contact surface adjacent said character contact surface, said inclined character contact surface operative for allowing said character contact surface to engage said characters.

10. An embossed card reader for reading characters embossed on a surface of a card, comprising:

a floating read head support block including a character contact surface, at least one guide rail, and defining a plurality of passageways perpendicular to said contact surface, said character contact surface being operative for moving along a surface defined by said characters;

a plurality of pins extending through said passageways and positioned to contact said characters, wherein each of said plurality of pins extend into a region defined by said character contact surface and said guide rail;

a biasing mechanism for biasing said contact surface against said embossed characters;

an angled character guide surface adjacent said contact surface, said angled character guide surface operative for allowing said guide rail to engage said card;

an angled character contact surface adjacent said character contact surface, said angled contact surface operative for allowing said character contact surface to engage said characters; and a plurality of electrical contact switches, each of said plurality of switches operatively associated with one of said plurality of pins, said electrical contact switches comprising electrically conductive fingers for making electrical circuits responsive to the movement of said pins in contact with said characters on said card.

11. An embossed card reader as recited in claim 10, wherein said fingers are mounted over said pins in a cantilever arrangement, and whereby said fingers are deformed in response to the movement of said pin in contact with said characters.

12. An embossed card reader as recited in claim 10, wherein said biasing mechanism comprises a plastic cover positioned above said read head.

13. An embossed card reader as recited in claim 10, wherein said horizontal character guide comprises two parallel rails extending from the edges of said horizontal character contact surface.

14. A method for reading embossed characters on a card, comprising the steps of:

providing a floating read head that is operative to move vertically relative to the surface of an embossed card, with embossment reading pins that are operative to move vertically relative to the surface of embossing on the card;

engaging the edge of an embossed card with card engaging guide rails provided on the floating read head;

responsive to the engagement of the card engaging guide rails with the card edge, lifting the floating read head relative to the surface of the card;

engaging embossing on the card with the embossment reading pins to read the embossing;

reading signals generated in response to movement of embossment reading pins; and, responsive to the signals, decoding characters represented by the embossing.

15. The method of claim 14, wherein the floating read head includes a character contact surface disposed for contacting with the embossing, and further comprising the step of further lifting the floating read head relative to the embossing responsive to engagement of the character contact surface with the embossing on the card.

16. A method for reading embossed characters on a card, comprising the steps of:

providing a read head support block including a character contact surface operative for moving along a surface defined by the top of said embossed characters and a plurality of passageways disposed perpendicular to the character contact surface;

providing a plurality of switches mounted on a side of said support block opposite the contact surface;

providing a plurality of pins extending through the passageways, the pins each having a first end extending to a point below the character contact surface and operative for engaging the embossed characters, and having a second end operative for actuating a corresponding one of the switches in response to axial movement of the pin;

moving the card and the read head support block relative to each other so that the embossed characters move along a path adjacent the character contact surface and in a direction perpendicular to the plurality of pins;

in response to the characters engaging the character contact surface, floating the read head support block so that the character contact surface remains in contact with the characters;

in response to each of the pins engaging one of the embossed characters, operating a corresponding one of the switches; and providing signals corresponding to the operation of said switches.

17. A method for reading embossed characters on a card as recited in claim 16, wherein the character contact surface comprises a horizontal character contact surface.

18. A method for reading embossed characters on a card as recited in claim 17, wherein the character contact surface further comprises an angled leading character contact surface.

19. A method for reading embossed characters on a card as recited in claim 16, wherein the read head support block further comprises card engaging guide rails positioned at outer edges of the character contact surface, and further comprising the step of floating the read head support block in response to the card engaging guide rails engaging the card.

20. A method for reading embossed characters on a card as recited in claim 19, wherein the card engaging guide rails comprise a pair of parallel guide rails that extend beyond the lowermost extent of the pins.

21. A method for reading embossed characters on a card as recited in claim 19, wherein the card engaging guide rails further comprise leading guide rail surfaces.

22. A method for reading embossed characters on a card as recited in claim 16, wherein the step of moving the card and the read head support block relative to each other comprises the step of moving the read head.

* * * * *